US011876314B2

(12) United States Patent
Endo

(10) Patent No.: US 11,876,314 B2
(45) Date of Patent: Jan. 16, 2024

(54) CONNECTOR AND DEVICE

(71) Applicant: NEC Platforms, Ltd., Kawasaki (JP)

(72) Inventor: Kunihiko Endo, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 309 days.

(21) Appl. No.: 17/299,056

(22) PCT Filed: Dec. 13, 2019

(86) PCT No.: PCT/JP2019/048890
§ 371 (c)(1),
(2) Date: Jun. 2, 2021

(87) PCT Pub. No.: WO2020/129831
PCT Pub. Date: Jun. 25, 2020

(65) Prior Publication Data

US 2022/0059955 A1 Feb. 24, 2022

(30) Foreign Application Priority Data

Dec. 17, 2018 (JP) ................................ 2018-235118

(51) Int. Cl.
*H01R 12/72* (2011.01)
*H01R 12/88* (2011.01)
*H01R 12/89* (2011.01)

(52) U.S. Cl.
CPC ........... *H01R 12/721* (2013.01); *H01R 12/88* (2013.01); *H01R 12/89* (2013.01)

(58) Field of Classification Search
CPC ....... H01R 12/121; H01R 12/88; H01R 12/89
USPC .......................................................... 439/142
See application file for complete search history.

(56) References Cited

U.S. PATENT DOCUMENTS 3,818,419 A * 6/1974 Crane .................... H01R 12/89 439/267
4,021,091 A * 5/1977 Anhalt .................. H01R 12/89 439/635

(Continued)

FOREIGN PATENT DOCUMENTS

GB 2095482 A * 9/1982 ............ H01R 12/89
JP S51-119972 A 10/1976

(Continued)

OTHER PUBLICATIONS

International Search Report for PCT Application No. PCT/JP2019/048890, dated Feb. 25, 2020.

(Continued)

*Primary Examiner* — Peter G Leigh
(74) *Attorney, Agent, or Firm* — Sughrue Mion, PLLC

(57) ABSTRACT

In order to reduce the probability that an electrode of a connector and a terminal part of a printed substrate are broken, this connector is provided with openings including a void, respectively, in at least one of surfaces perpendicular to generating lines of two prismatic surfaces facing each other with the void therebetween and having parallel generating lines, and at least one of surfaces parallel to the generating lines, and is equipped with: a first member which is disposed in the void, and performs a first movement that is a movement in a direction parallel to the generating lines; a second member which, following the first member, performs a second movement that is a movement in a direction corresponding to the direction of the movement of the first member between respectively predetermined first point and second point.

20 Claims, 26 Drawing Sheets

(56) References Cited

U.S. PATENT DOCUMENTS

| | | | | | |
|---|---|---|---|---|---|
| 4,080,027 | A | * | 3/1978 | Benasutti | H01R 12/89<br>439/260 |
| 4,085,990 | A | * | 4/1978 | Jayne | H01R 12/89<br>439/267 |
| 4,159,154 | A | * | 6/1979 | Arnold | H01R 12/89<br>439/267 |
| 4,159,861 | A | * | 7/1979 | Anhalt | H01R 12/89<br>439/267 |
| 4,196,955 | A | * | 4/1980 | Anhalt | H01R 12/89<br>439/267 |
| 4,478,471 | A | * | 10/1984 | Olsson | H01R 12/88<br>439/267 |
| 4,606,594 | A | * | 8/1986 | Grabbe | H01R 12/88<br>439/267 |

FOREIGN PATENT DOCUMENTS

| | | | | | |
|---|---|---|---|---|---|
| JP | S56-138487 | U | | 6/1983 | |
| JP | H01-313864 | A | | 12/1989 | |
| JP | H01313864 | A | * | 12/1989 | H01R 12/89 |
| JP | H10-247567 | A | | 9/1998 | |
| JP | 2004-134102 | A | | 4/2004 | |
| JP | 2016-004729 | A | | 1/2016 | |

OTHER PUBLICATIONS

English translation of Written opinion for PCT Application No. PCT/JP2019/048890, dated Feb. 25, 2020.

* cited by examiner

CONNECTOR AND DEVICE

This application is a National Stage Entry of PCT/JP2019/048890 filed on Dec. 13, 2019, which claims priority from Japanese Patent Application 2018-235118 filed on Dec. 17, 2018, the contents of all of which are incorporated herein by reference, in their entirety.

TECHNICAL FIELD

The present invention relates to a structure in which wires are connected.

BACKGROUND ART

In a general connector for connecting a printed substrate, an opening for allowing insertion of a terminal part of the printed substrate faces one direction. Then, the connector is secured to a substrate or the like in such a way that the opening faces upward in a housing of a device. Therefore, when the terminal part of the printed substrate is inserted into the connector installed in the device, it is necessary to insert the terminal part from above in a direction perpendicular to the opening.

FIG. 1 is schematic views illustrating a first method of connecting a substrate 301, which is a printed substrate, to a device 200 that is an example of a device capable of being connected with a terminal part of the printed substrate.

In the device 200, as illustrated in FIG. 1, a connector 204 is installed in such a way that an opening 205 faces upward.

As illustrated in FIG. 1(*a*), a worker (not illustrated) first removes a top plate 201 of a housing 211 of the device 200. Then, the worker positions the substrate 301 above the connector 204 in such a way that a terminal part 306 of the substrate 301 faces the opening 205. Then, the worker lowers the substrate 301 in such a way that the terminal part 306 is accommodated in the opening 205, and as illustrated in FIG. 1(*b*), connects the terminal part 306 to the connector 204.

FIG. 2 is schematic views illustrating a second method of connecting a substrate 301, which is a printed substrate, to a device 200 that is an example of a device capable of being connected with a terminal part of the printed substrate.

Herein, it is assumed that an insertion opening (not illustrated) for inserting the substrate 301 into a housing is formed on a right wall of a housing 211 of the device 200 illustrated in FIG. 2.

As illustrated in FIG. 2(*a*), a worker (not illustrated) inserts the substrate 301 through the insertion opening into the housing 211.

Then, as illustrated in FIG. 2(*b*), the worker positions the substrate 301 above a connector 204 in such a way that a terminal part 306 of the substrate 301 faces an opening 205.

Then, the worker lowers the substrate 301 in such a way that the terminal part 306 is accommodated in the opening 205, and as illustrated in FIG. 2(*c*), connects the terminal part 306 to the connector 204.

However, the above-mentioned first method requires a time-consuming process since it is necessary to remove the top plate 201 of the housing 211 at a time of connecting the terminal part 306 of the substrate 301 to the connector 204 in the device 200.

In the above-mentioned second method, as illustrated in FIG. 2(*c*), it is necessary to provide a space 911 above the substrate 301 connected to the connector 204, the space 911 serving for making the connection. Therefore, use of this method makes it difficult to miniaturize the device.

In order to solve such problems as described above, there is disclosed a method of connecting a substrate to a device by providing not only an opening above a connector but also an opening on a side surface, and inserting an electrode part from the side surface.

PTL 1 discloses an edge connector in which one end of a slit into which a terminal part of a printed substrate is inserted is made as an opening part, and the terminal part is moved in parallel to the slit through this opening part, and is thereby made attachable/detachable to/from the slit.

CITATION LIST

Patent Literature

[PTL 1] Japanese Unexamined Patent Application Publication No. H10-247567

SUMMARY OF INVENTION

Technical Problem

In the method disclosed in PTL 1, at a time of attaching/detaching the terminal part of the printed substrate to/from the connector, the electrode part of the connector alternately rubs against a portion on which a terminal is formed in the terminal part of the printed substrate and a portion on which a terminal is not formed. In the terminal part, a step difference is present between the portion on which the terminal is formed and the portion on which the terminal is not formed. Therefore, the attachment/detachment of the terminal part of the printed substrate to/from the connector is performed by repetition of an action that an electrode of the connector gets over the step difference. Therefore, the method disclosed in PTL 1 is greatly burdensome for both of the electrode of the connector and the terminal part of the printed substrate. Therefore, in a case of using the method disclosed in PTL 1, a probability of breakage of the electrode of the connector and the terminal of the printed substrate is high.

An object of the present invention is to provide a connector and the like that are capable of reducing a probability of breakage of an electrode of the connector and a terminal part of a printed substrate.

Solution to Problem

A connector according to the present invention is provided with an opening including a void, in at least one surface perpendicular to generating lines, which are parallel to each other, of two prismatic surfaces facing each other with the void sandwiched therebetween, and in at least one surface parallel to the generating lines, the connector including: a first member that is disposed in the void and performs a first movement being a movement in a direction parallel to the generating lines; a second member that, following the first member, performs a second movement between separately predetermined first point and second point, the second movement being a movement in a direction associated to a direction of the movement of the first member; and an electrode that has a part secured to the second member, and does not share a point with the void except where the electrode comes into contact with the prismatic surfaces when the second member is located at the first point.

Advantageous Effects of Invention

The connector according to the present invention is capable of reducing a probability of breakage of the electrode of the connector and the terminal part of the printed substrate.

EXAMPLE EMBODIMENTS

[Configuration and Operation]

Figure 1:
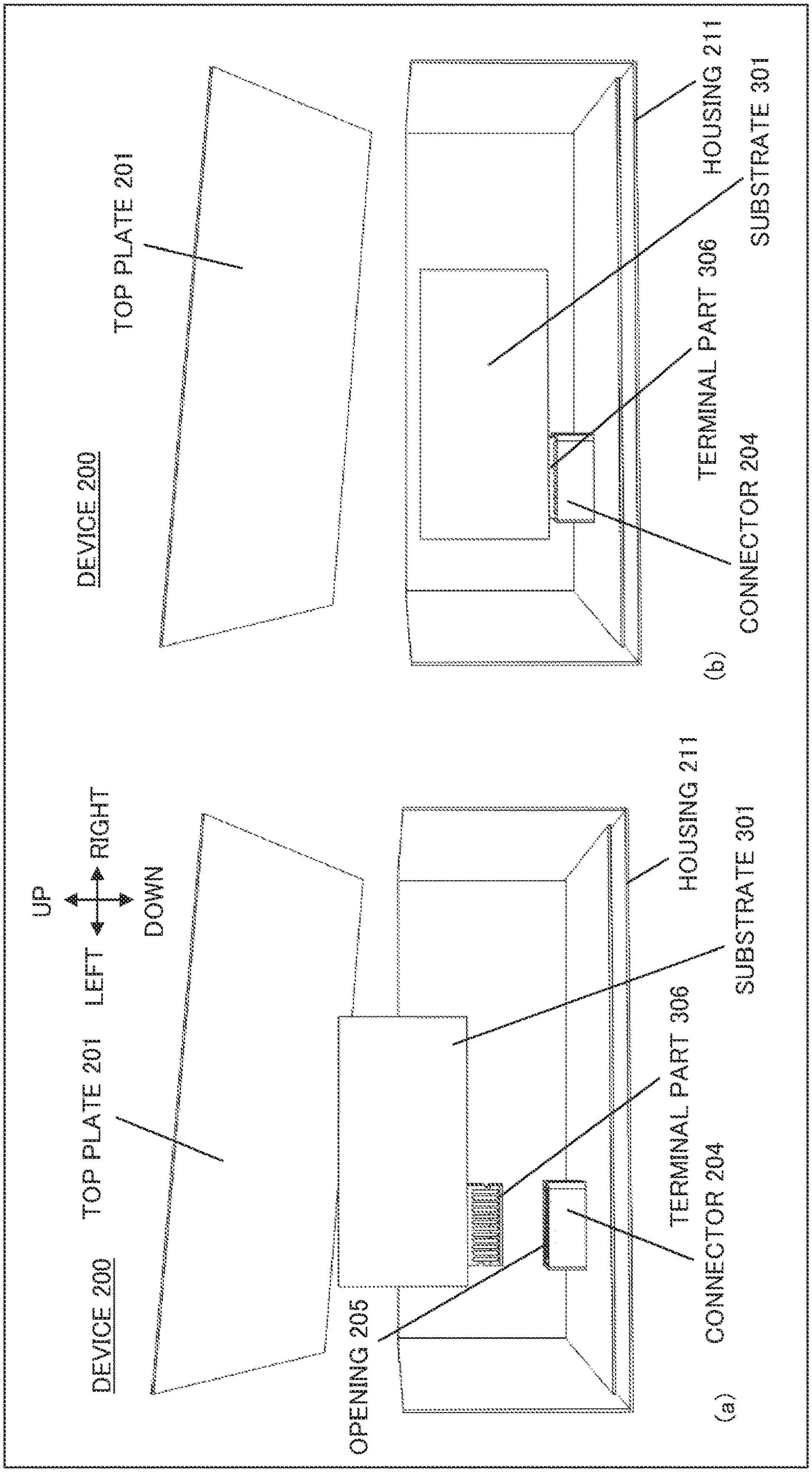
FIG. 1 is a schematic diagram illustrating a general method (No. 1) of connecting a printed substrate to a device.
Figure 2:
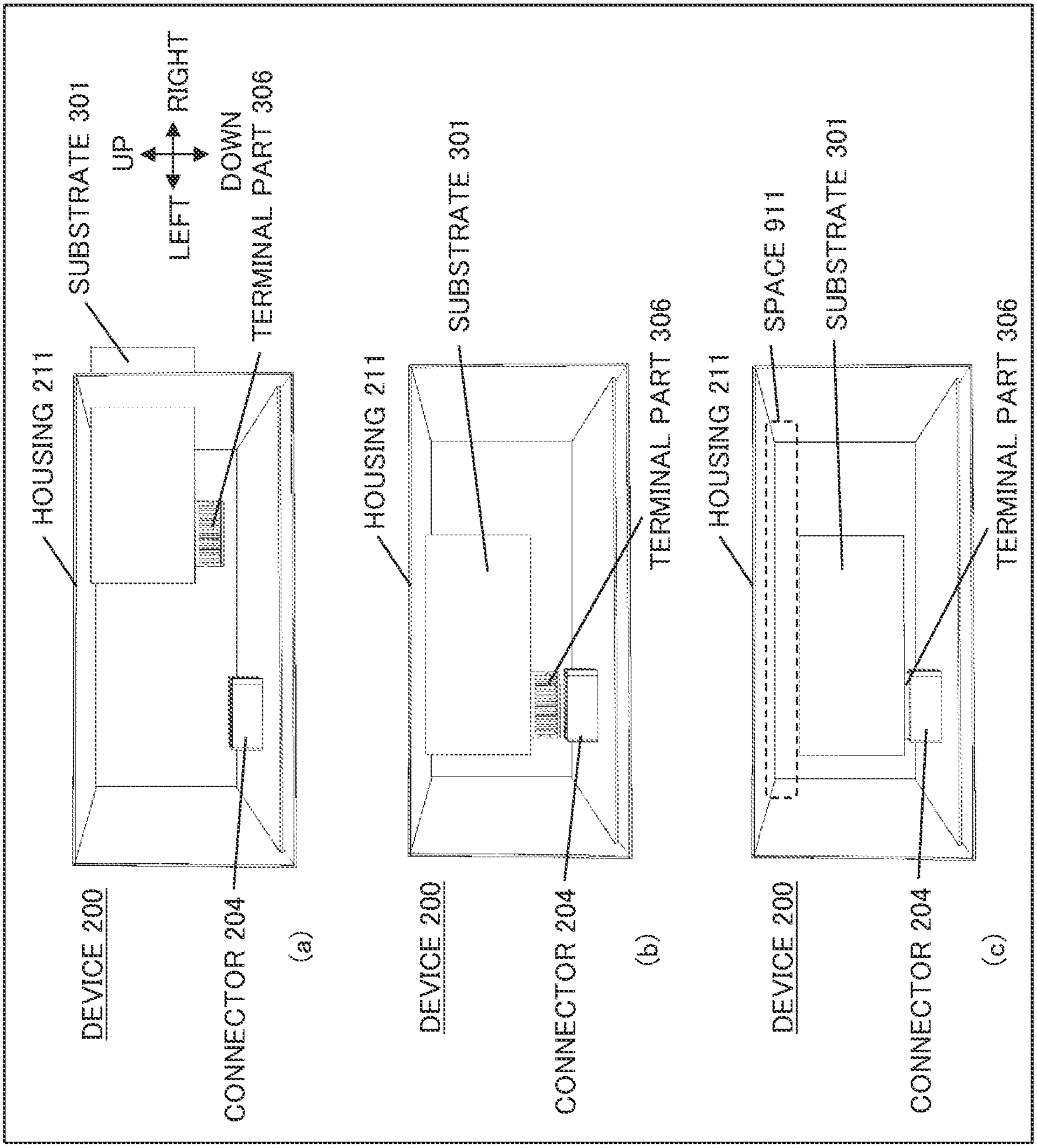
FIG. 2 is a schematic diagram illustrating a general method (No. 2) of connecting the printed substrate to the device.
Figure 3:
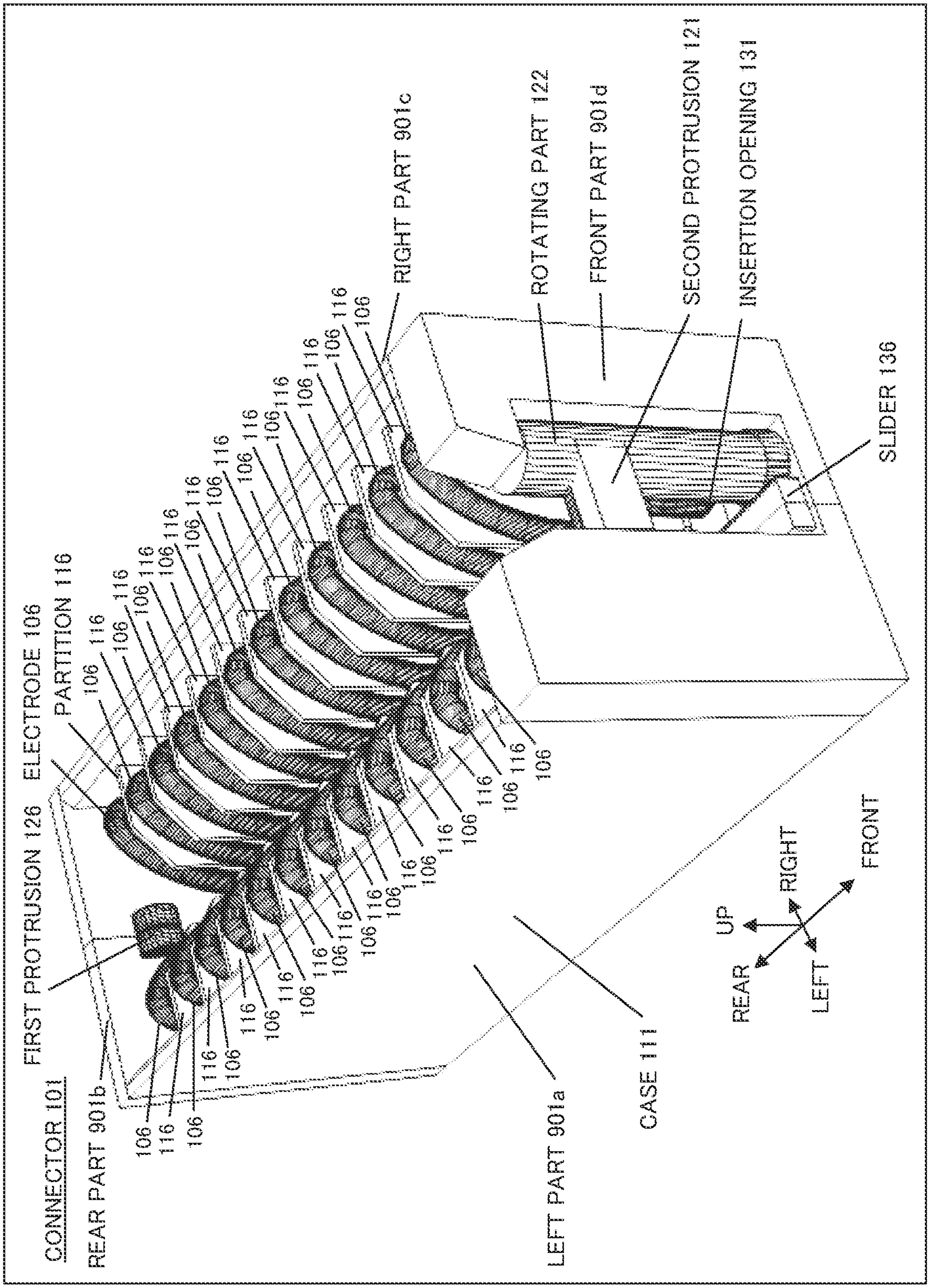
FIG. 3 is a perspective schematic diagram illustrating a configuration example of a connector according to the present example embodiment.
Figure 4:
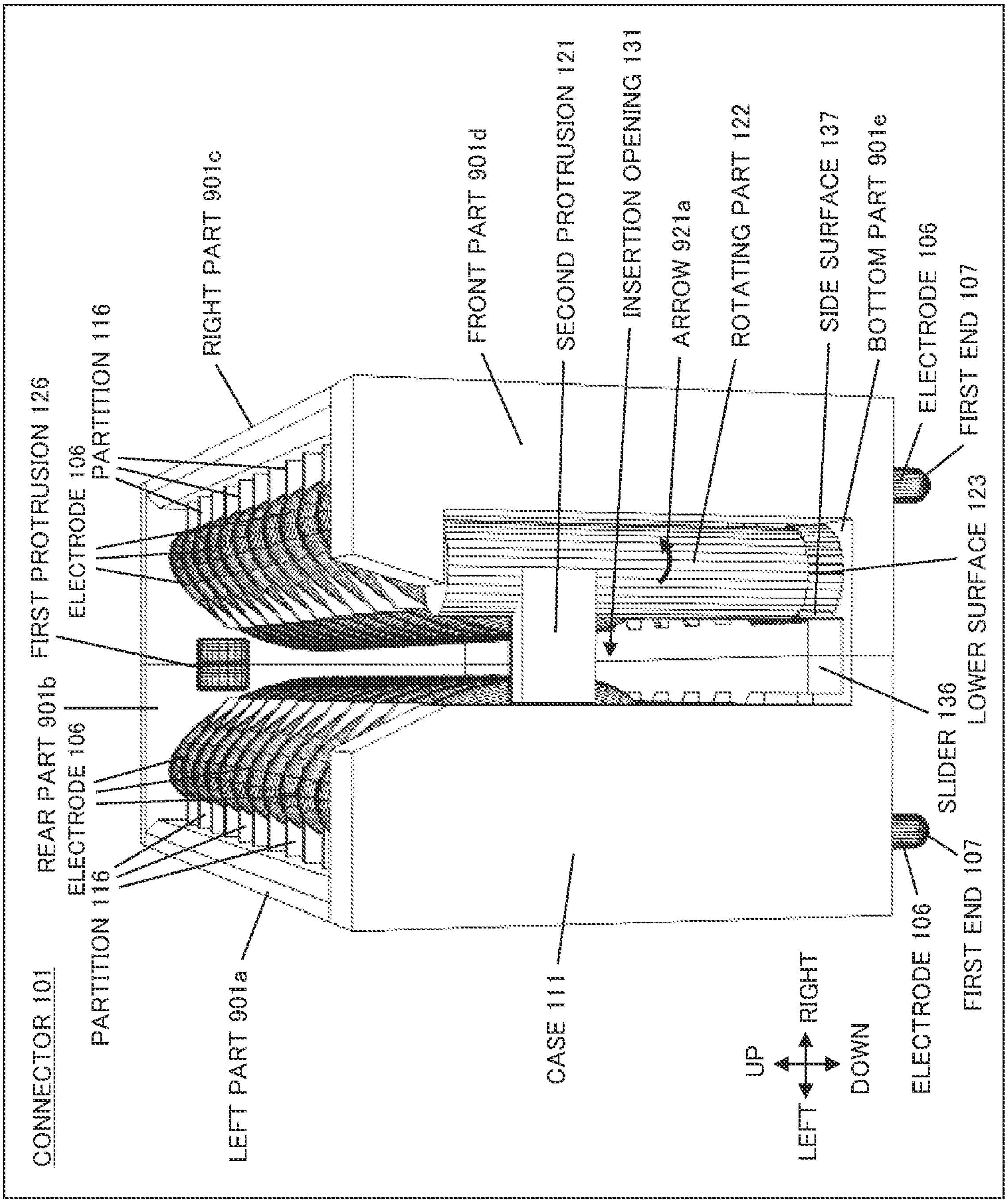
FIG. 4 is a front schematic diagram illustrating a configuration example of the connector according to the present example embodiment.

FIG. 3 is a perspective schematic diagram illustrating a configuration of a connector 101 according to the present example embodiment. FIG. 4 is a front schematic diagram of the connector 101 illustrated in FIG. 3.

FIG. 3 and FIG. 4 illustrate a state before a substrate terminal part is started to be inserted into the connector 101.

The connector 101 includes a case 111, electrodes 106, partitions 116, a slider 136, a first protrusion 126, a rotating part 122, and a second protrusion 121.

The electrodes 106 are portions with which respective terminals formed on a terminal part of a substrate come into contact when the terminal part is properly inserted into the connector 101. The electrodes 106 are composed of an elastic conductive material that deforms when a certain amount of force is applied, but returns to an original shape when the force is no longer applied. For example, this conductive material is metal such as spring steel. A configuration of the substrate to be inserted into the connector 101 will be described later with reference to FIG. 14.

By the contact described above, a circuit formed on the substrate can be connected to a circuit to which the connector 101 is connected, the circuit being included in a device in which the connector 101 is provided. A lower part of each of the electrodes 106 is secured to a bottom part 901*e* that is a lowermost member constituting the case 111 and illustrated in FIG. 4.

For example, the case 111 is formed of an insulating material such as resin.

Partitions 116 are provided on inner side surfaces of a left part 901*a* that is a leftmost member constituting the case 111 and of a right part 901*c* that is a rightmost member constituting the case 111, the leftmost and rightmost members being illustrated in FIG. 4. For example, the partitions 116 are formed of an insulating material such as resin. An interval between adjacent two of the partitions 116 is substantially equal. Each of the partitions 116 is secured to the inner side surface of the left part 901*a* or the right part 901*c* or the bottom part 901*e* of the case 111, which is illustrated in FIG. 4, or is formed integrally therewith.

An insertion opening 131 is provided in a front part 901*d* that is a most proximal member constituting the case 111 and illustrated in FIG. 4. The insertion opening 131 serves for inserting or pulling out the substrate terminal part.

Figure 14:
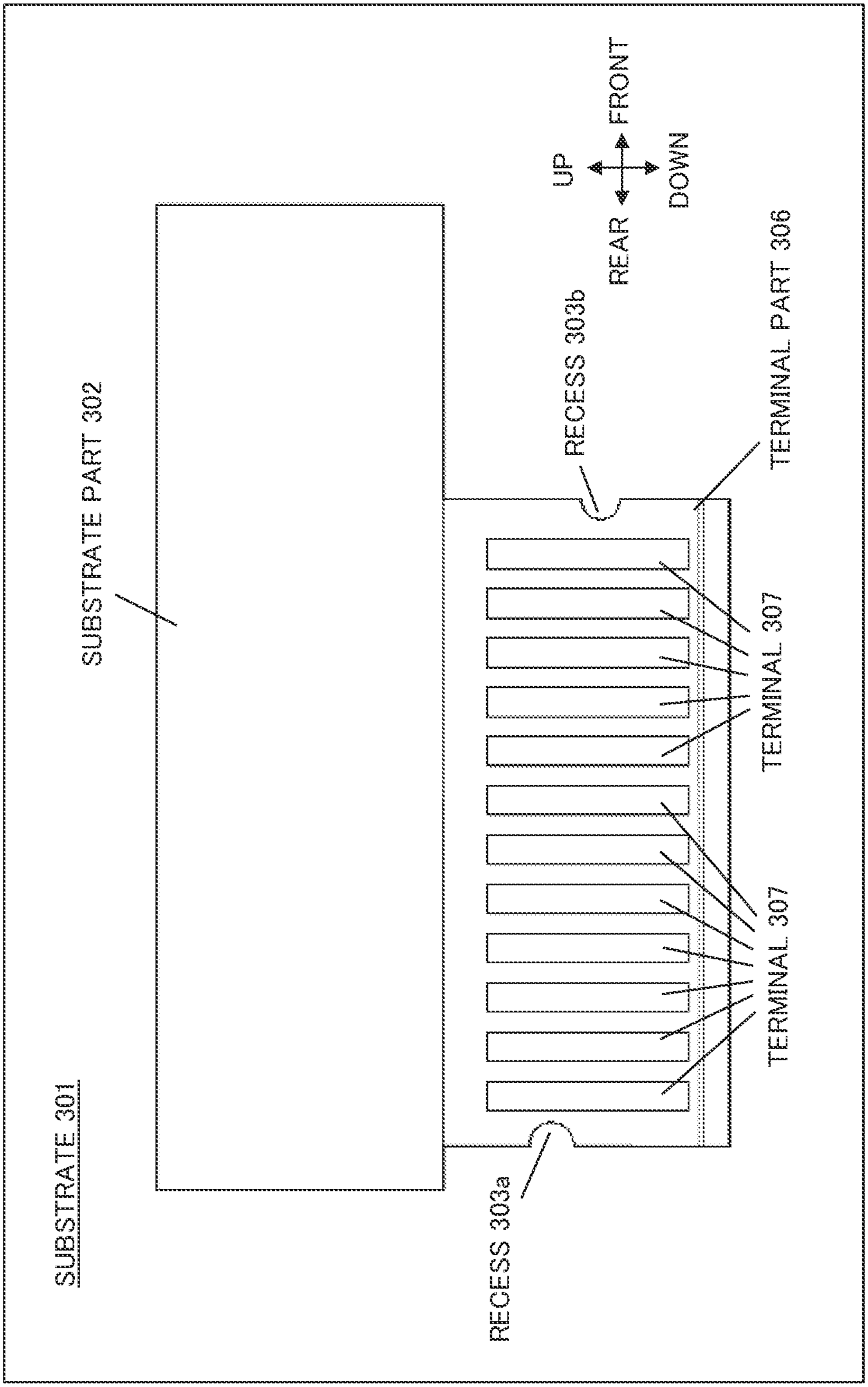
FIG. 14 is a schematic view illustrating an example of a substrate attached to the connector according to the present example embodiment.

The first protrusion 126 is secured to an inside of a rear part 901*b* that is a distalmost member constituting the case 111 in FIG. 4. The first protrusion 126 may be formed integrally with the rear part 901*b*. The first protrusion 126 is a portion assumed to be inserted into a recess 303*a* of the terminal part 306 when the terminal part 306 of the substrate 301 that will be described later with reference to FIG. 14 is properly attached to the connector 101.

The rotating part 122 is provided on a right side of the insertion opening 131 of the case 111. The rotating part 122 can rotate around a rotating shaft that will be described later with reference to FIG. 5, the rotating shaft being secured to the bottom part 901*e* illustrated in FIG. 4 in a direction perpendicular to an upper surface of the bottom part 901*e*.

The rotating part 122 performs the rotation, for example, by using power from a drive unit (not illustrated). The drive unit has, for example, a configuration including a motor that rotates the rotating part 122. The second protrusion 121 is secured to the rotating part 122. The rotating part 122 and the second protrusion 121 may be formed integrally with each other. A proximal side of the second protrusion 121, which is illustrated in FIG. 4, has a flat shape for example. Meanwhile, a back side of the second protrusion 121, which is illustrated in FIG. 4, has a protruding shape, although not visible in FIG. 4. This portion with the protruding shape is a part assumed to be inserted into a recess 303*b* of the terminal part 306 when the terminal part 306 of the substrate 301 that will be described later with reference to FIG. 14 is properly attached to the connector 101.

A lower surface 123 that is a lower side surface of the rotating part 122 illustrated in FIG. 4 is in contact with a side surface 137 of the slider 136. On portions of the lower surface 123 and the side surface 137, the portions coming into contact with each other, non-slip regions which prevent a slip therebetween are formed. The non-slip regions will be described later with reference to FIG. 5. When the rotating part 122 is rotated in a direction of an arrow 921*a* illustrated in FIG. 4, then by the non-slip regions, the slider 136 slides on the bottom part 901*e*, and is pulled out forward. Meanwhile, when the second protrusion 121 is rotated opposite to the direction of the arrow 921*a* illustrated in FIG. 4, the slider 136 slides backward (to the depth) on the bottom part 901*e*.

As illustrated in FIG. 4, each left edge of the electrodes 106 on a right side of a center in FIG. 4 protrudes leftward from each left edge of the partitions 116 on the right side of the center. As illustrated in FIG. 4, each right edge of the electrodes 106 on a left side to the center protrudes rightward from each right edge of the partitions 116 on the left side of the center.

The rotating part 122 rotates in the direction of the arrow 921*a* illustrated in FIG. 4 and thereby causes the second protrusion 121 to turn in such a way that the second protrusion no longer blocks the insertion opening 131, and in addition, the slider 136 slides forward, whereby protrusion of the edges of the electrodes 106 from the edges of the partitions 116 is eliminated. A mechanism for achieving this operation will be described later with reference to FIG. 6 and subsequent diagrams.

Figure 5:
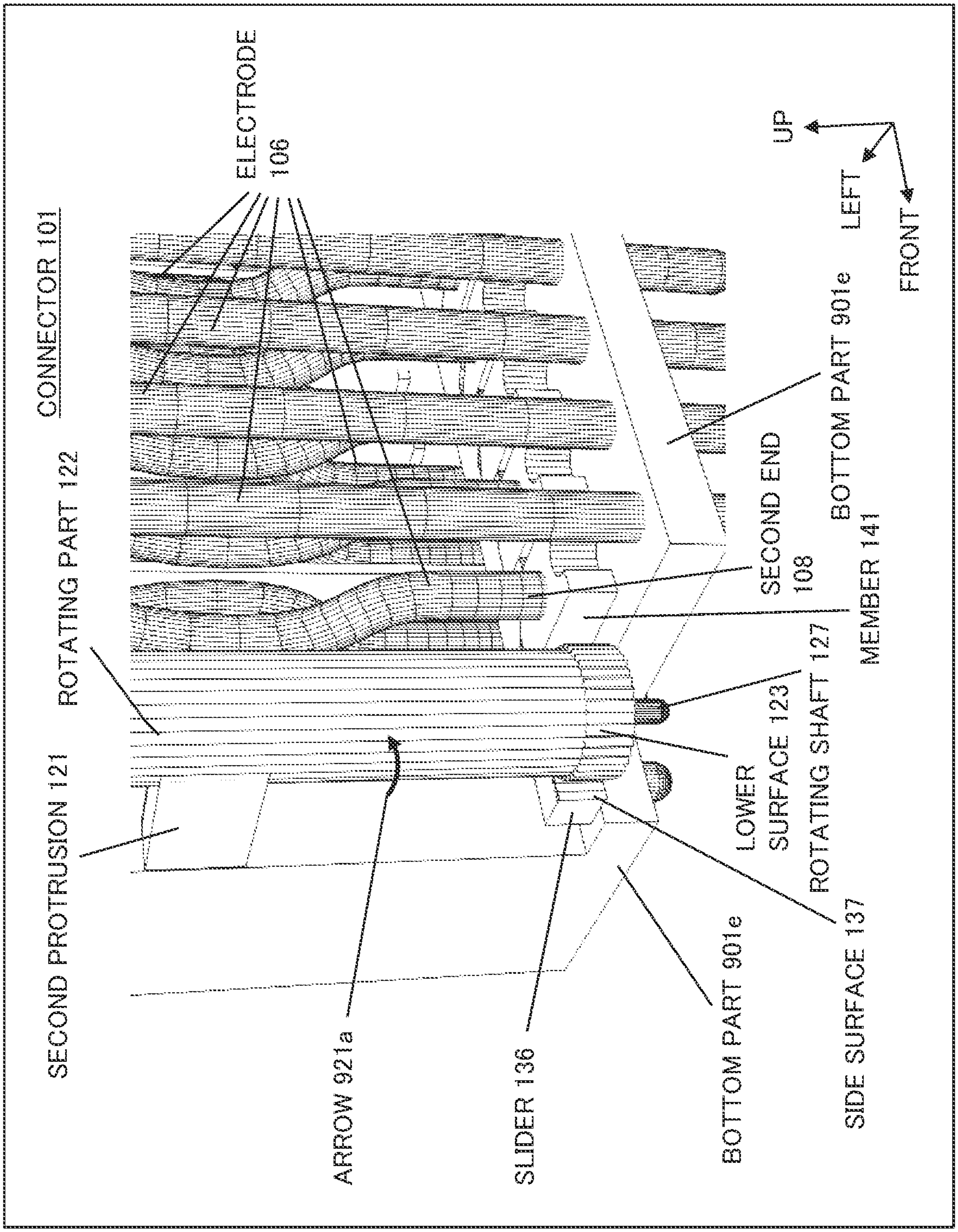
FIG. 5 is a schematic diagram illustrating a vicinity of a lower surface of a rotating part and a side surface of a slider.

FIG. 5 is a schematic diagram illustrating a vicinity of the lower surface 123 of the rotating part 122 illustrated in FIG. 4 and of the side surface 137 of the slider.

The rotating shaft 127 is secured to the bottom part 901*e* in such a way as to be perpendicular to the upper surface of the bottom part 901*e*. The rotating part 122 can rotate around the rotating shaft 127. The rotating part 122 performs the rotation, for example, by drive by a motor (not illustrated).

The second protrusion 121 is secured to the rotating part 122, or is formed integrally with the rotating part 122.

When the rotating part 122 rotates in the direction of the arrow 921*a* by the motor (not illustrated) or the like, the second protrusion 121 is opened in a direction of not blocking the insertion opening 131. Then, the lower surface 123 of the rotating part 122 rotates around the rotating shaft 127. By the rotation of the lower surface 123, the slider 136 that is in contact with the lower surface 123 via each other's teeth is pulled out forward.

Figure 6:
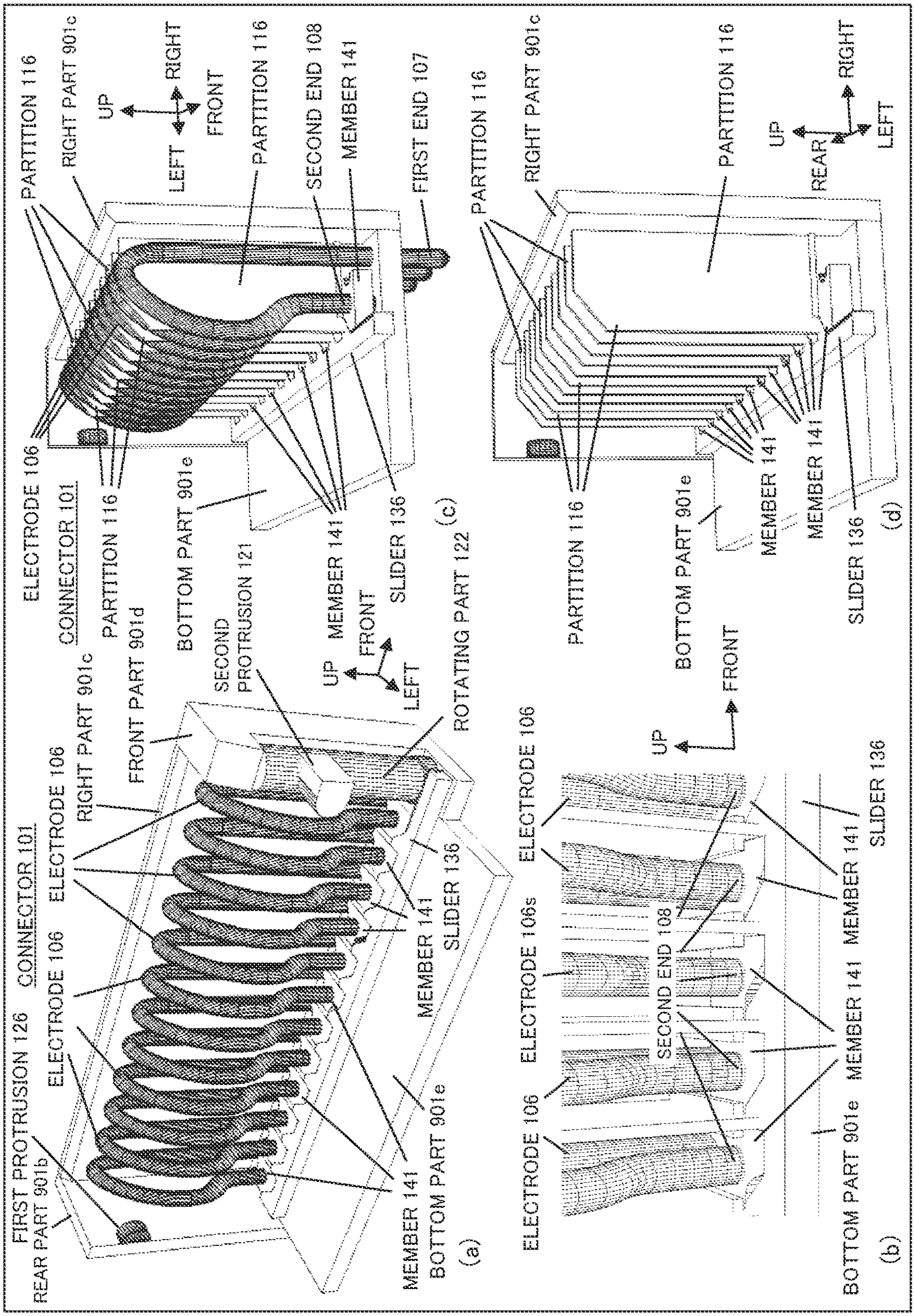
FIG. 6 is perspective schematic diagrams illustrating an inside of a case of the connector according to the present example embodiment.

FIG. 6 is perspective schematic diagrams illustrating an inside of the case 111 of the connector illustrated in FIG. 3 and FIG. 4.

FIG. 6(*a*) is a diagram illustrating a portion including a row of the electrodes 106 on the right side, which are illustrated in FIG. 4, without illustrating the partitions 116. FIG. 6(*a*) illustrates only a half of the slider 136 illustrated in FIG. 4, the half being a right-side part from the center.

FIG. 6(*b*) is a diagram illustrating a vicinity of the members 141 illustrated in FIG. 6(*a*).

FIG. 6(*c*) is a diagram illustrating a portion corresponding to that in FIG. 6(*a*) when viewed from a proximal side of FIG. 4. FIG. 6(*c*) illustrates the partitions 116 illustrated in FIG. 4.

FIG. 6(*d*) is a diagram illustrating a portion corresponding to that in FIG. 6(*c*), illustrating the partitions 116 without illustrating the electrodes 106.

As illustrated in FIG. 6(*c*), a first end 107 of each of the electrodes 106 penetrates the bottom part 901*e*, and is secured to the bottom part 901*e*.

A second end 108 of each of the electrodes 106 is secured to each of the members 141.

Each of the members 141 is installed in such a way as to be slidable rightward between adjacent two of the partitions 116 on the upper surface of the bottom part 901*e*, the partitions 116 being illustrated in FIG. 6(*d*).

Each of the second ends 108 of the electrodes 106 is secured to each of the members 141. Therefore, when each of the members 141 slides rightward, each of the second ends 108 moves rightward. Thus, a left edge of each of the electrodes 106 illustrated in FIG. 6(*c*) moves rightward.

The fourth member 141 from the front, which is illustrated with a deep color in FIG. 6(*a*), has a shape different from that of the other members 141 as will be described later (the difference in shape is not illustrated in FIG. 6(*a*)). This matter will be described later with reference to FIGS. 10 and 13.

Figure 7:
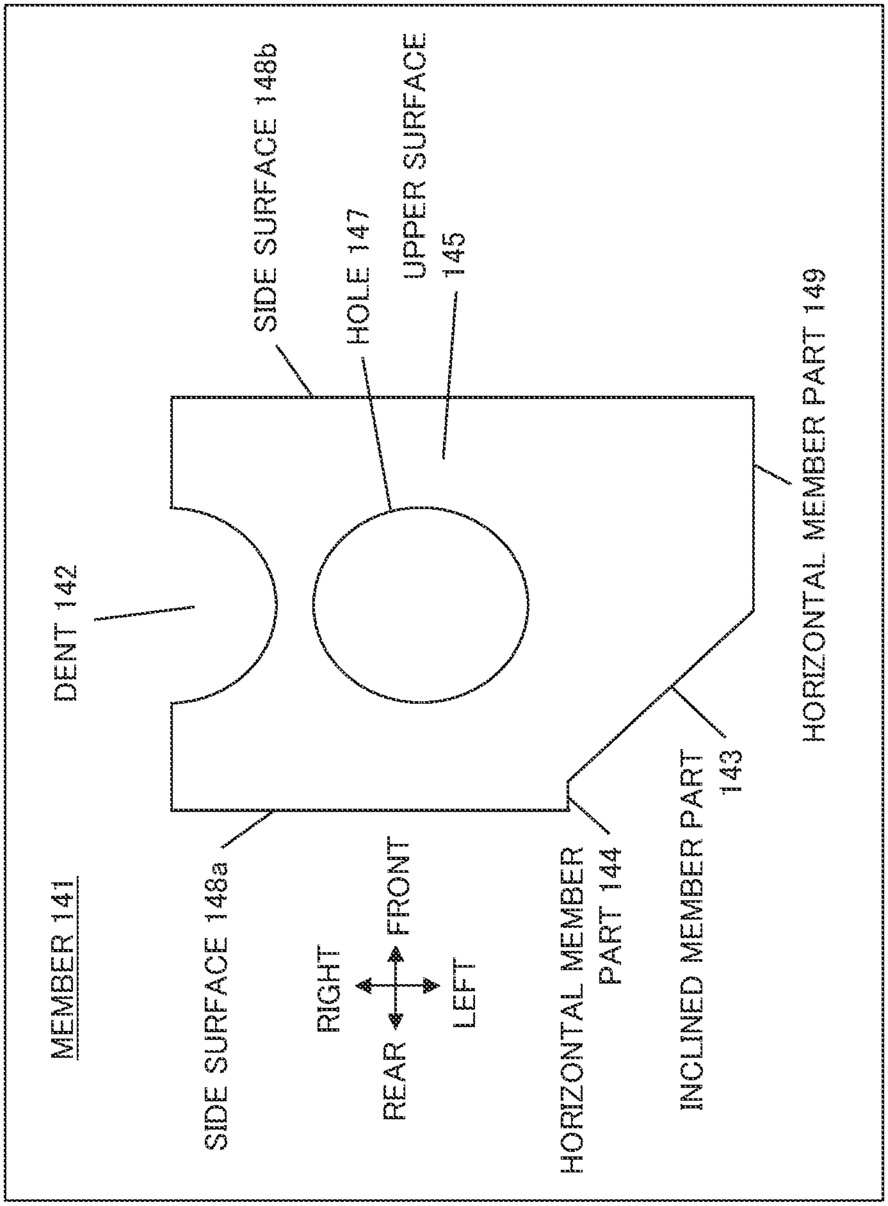
FIG. 7 is a top diagram illustrating an example of a member 141.

FIG. 7 is a top diagram illustrating an example of the member 141 illustrated in FIG. 6.

The member 141 is formed by processing a plate with a flat lower surface into a shape illustrated in FIG. 7.

In the member 141, there are formed a dent 142, a hole 147, side surfaces 148*a* and 148*b*, horizontal member parts 144 and 149, and an inclined member part 143.

The side surfaces 148*a* and 148*b* are portions which come into contact with side surfaces of the adjacent two of the partitions 116 illustrated in FIG. 6(*c*) when the member 141 slides between these partitions 116. In the member 141, a sliding direction thereof is guided by the contact to a left/right direction illustrated in FIG. 6(*c*).

Into the hole 147, the second end 108 of the electrode 106, which is illustrated in FIGS. 6(*b*) and 6(*c*), is inserted. The hole 147 does not necessarily need to penetrate the member 141, and may be a dent.

The hole 147 may be omitted when the second end 108 can be secured to the upper surface 145 by an adhesive or the like without the hole 147.

The dent 142 is a portion into which a part of the first end 107 of the electrode 106 fits, the part immediately above the bottom part 901*e*, when the member 141 slides right ward in FIG. 6(*c*).

Figure 12:
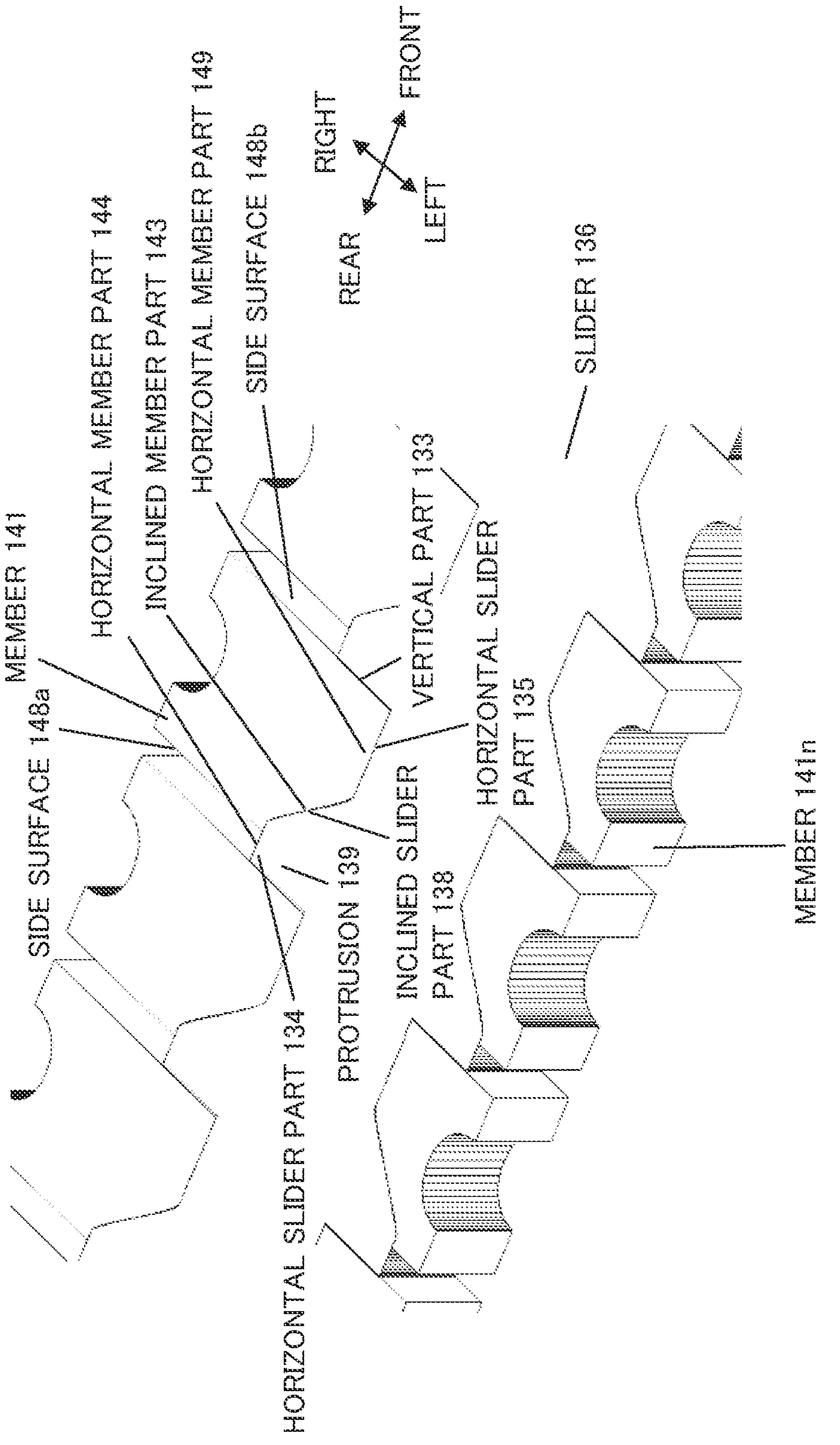
FIG. 12 is an enlarged diagram of a configuration illustrated in FIG. 10.

As illustrated in FIG. 12 to be described later, the inclined member part 143 is a portion that can come into contact with an inclined slider part 138 of a protrusion 139 of the slider 136.

As illustrated in FIG. 12 to be described later, the horizontal member parts 144 and 149 are portions which can come into contact with horizontal slider parts 134 and 135 of the slider 136.

Figure 8:
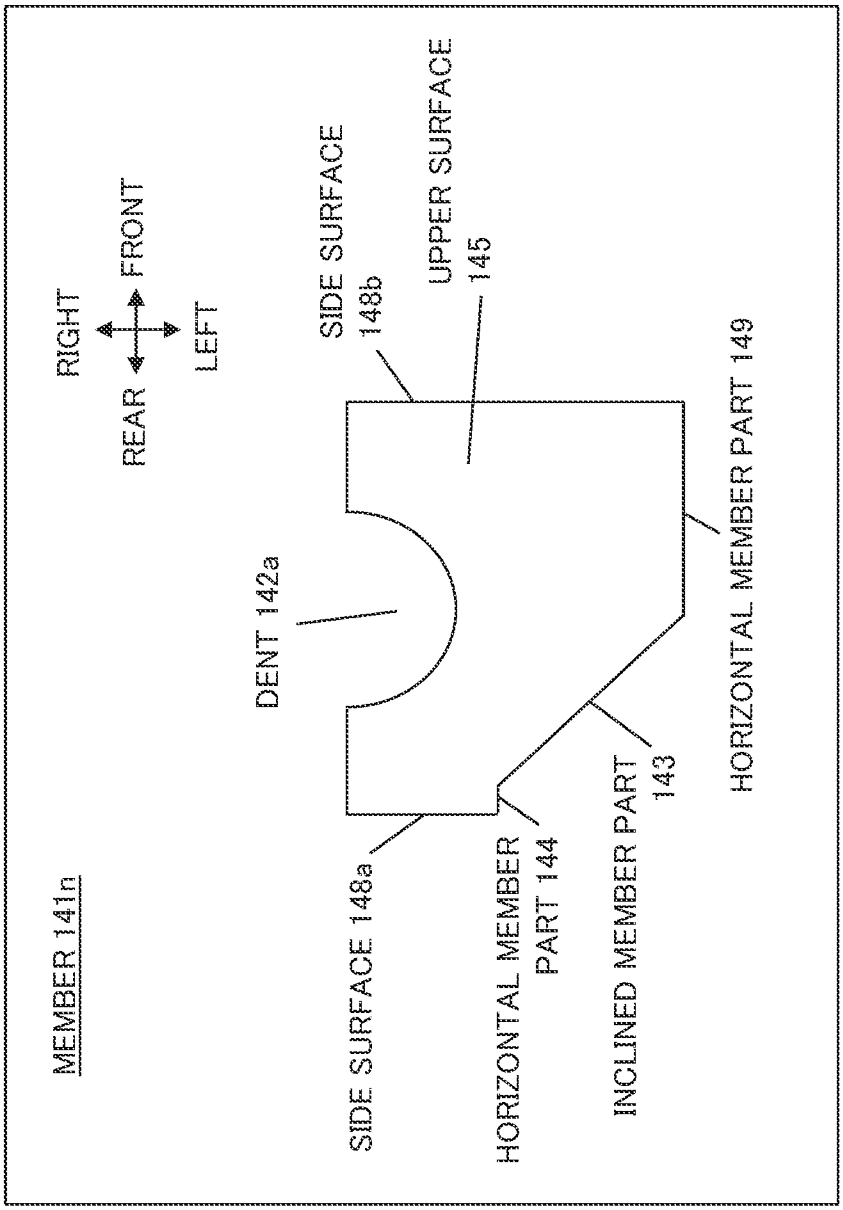
FIG. 8 is a top diagram illustrating a variation of the member 141.

FIG. 8 is a top diagram illustrating a member 141*n* that is a variation of the member 141.

The member 141*n* is formed by processing a plate with a substantially uniform thickness into a shape illustrated in FIG. 8.

In the member 141*n*, there are formed a dent 142*a*, side surfaces 148*a* and 148*b*, horizontal member parts 144 and 149, and an inclined member part 143.

The side surfaces 148*a* and 148*b* are portions that come into contact with the side surfaces of the adjacent two of the partitions 116 illustrated in FIG. 6(*c*) when the member 141*n* slides between these partitions 116. In the member 141*n*, a sliding direction thereof is guided by the contact to the left/right direction illustrated in FIG. 6(*c*).

The member 141*n* is different from the member 141 illustrated in FIG. 7 in that, in comparison with the member 141 illustrated in FIG. 7, a length in the left/right direction is shorter, the hole 147 is not formed, and a dent 142*a* is formed in place of the dent 142.

A distance between a left end of the dent 142*a* and the horizontal member part 149, which are illustrated in FIG. 8, is substantially equal to a distance between a left end of the hole 147 and the horizontal member part 149, which are illustrated in FIG. 7. The dent 142*a* is a portion to which the second end part of the electrode 106, which is illustrated in FIGS. 6(*b*) and 6(*c*), is assumed to be secured in a fitted state.

Figure 9:
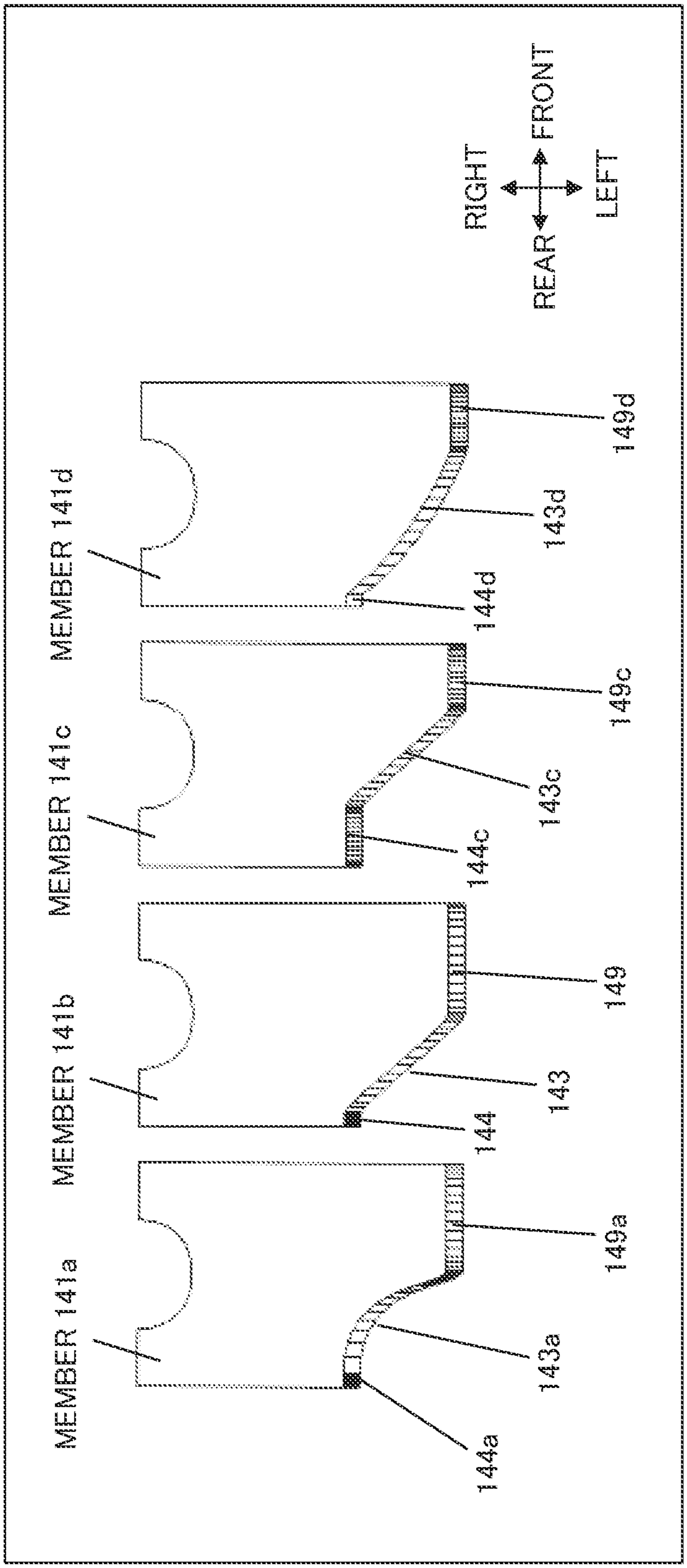
FIG. 9 is diagrams illustrating variations of the member 141.

FIG. 9 is diagrams illustrating variations of the member 141 illustrated in FIG. 7.

In a member 141*a*, a horizontal member part 144*a* that is a portion corresponding to the horizontal member part 144 of the member 141 illustrated in FIG. 7 continuously connects to an inclined member part 143*a* that is a portion corresponding to the inclined member part 143, forming a curved shape protruding toward right front. In the member 141*a*, a length of a horizontal member part 149*a* corresponding to the horizontal member part 149 illustrated in FIG. 7 is approximately the same as a length of the horizontal member part 149 illustrated in FIG. 7.

A member 141*b* has the same shape as the member 141 illustrated in FIG. 7, except that there is none corresponding to the hole 147 illustrated in FIG. 7.

In a member 141*c*, a length of a horizontal member part 144*c* corresponding to the horizontal member part 144 illustrated in FIG. 7 is longer than a length of the horizontal member part 144 illustrated in FIG. 7. In the member 141*c*, moreover, a length of a horizontal member part 149*c* corresponding to the horizontal member part 149 illustrated in FIG. 7 is shorter than a length of the horizontal member part 149 illustrated in FIG. 7. In the member 141*c*, moreover, a length and extent of inclination of an inclined member part 143*c* corresponding to the inclined member part 143 illustrated in FIG. 7 are approximately the same as a length and extent of inclination of the inclined member part 143 illustrated in FIG. 7.

In a member 141*d*, an inclined member part 143*d* corresponding to the inclined member part 143 of the member 141 illustrated in FIG. 7 has a curved shape protruding toward left rearward.

Figure 10:
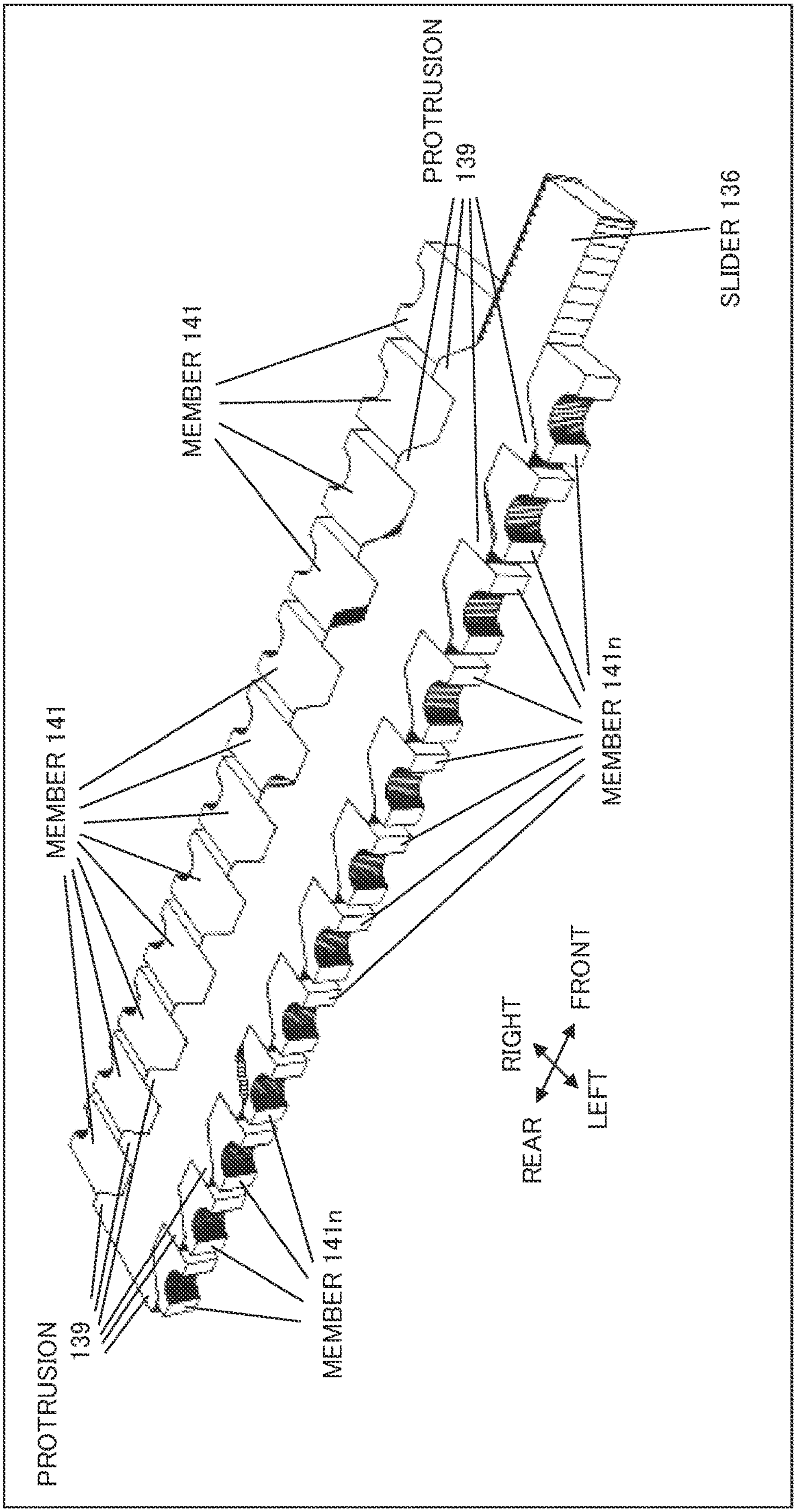
FIG. 10 is a diagram illustrating a combination of the slider and members.
Figure 11:
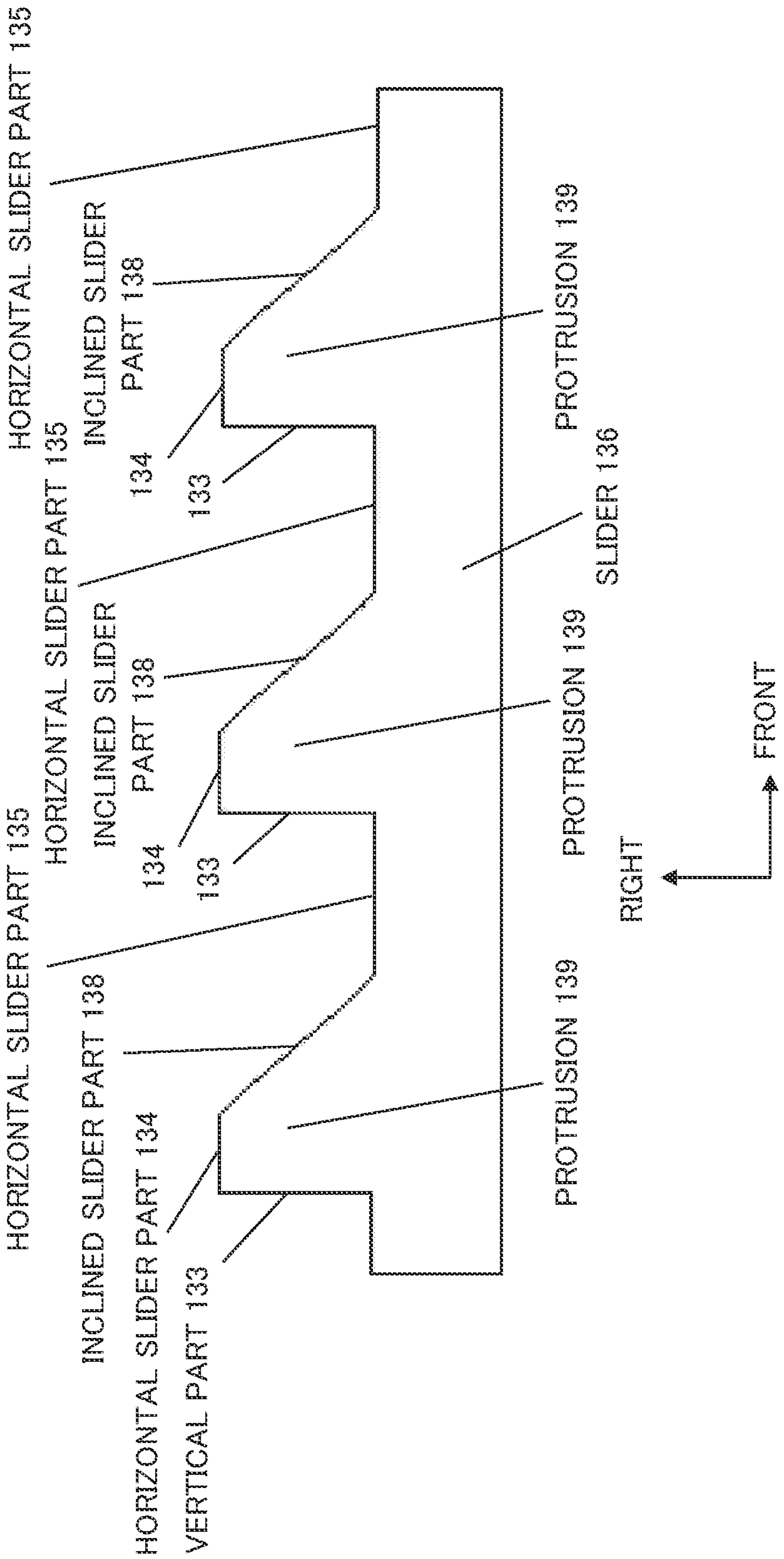
FIG. 11 is a partially enlarged diagram of the slider.

FIG. 10 is a diagram illustrating a combination of the slider 136 illustrated in FIGS. 3 to 6 and the members 141 and 141*n*. FIG. 11 is a partially enlarged diagram of the slider 136 illustrated in FIG. 10. FIG. 12 is an enlarged diagram of a configuration illustrated in FIG. 10.

As illustrated in FIG. 10, the members 141 are arranged on a right side of the slider 136, and the members 141*n* are arranged on a left side of the slider 136. The members 141 illustrated in FIG. 10 are the members 141 illustrated in FIG. 7. In FIG. 10, illustration of the hole 147 illustrated in FIG. 7 is omitted. Note that, a fourth member 141 from the front in FIG. 10 is the member 141*c* illustrated in FIG. 9. A reason that such a member having a different shape is provided as described above will be described later with reference to FIG. 24.

Members 141*n* illustrated in FIG. 10 are the members 141*n* illustrated in FIG. 8. In FIG. 10, the members 141*n* illustrated in FIG. 8 are reversed and arranged. Note that, a fourth member 141*n* from the rear in FIG. 10 is one in which, in the member 141*n* illustrated in FIG. 8, shapes of the horizontal member parts 144 and 149 and the inclined member part 143 are replaced by shapes of portions in the member 141*c* illustrated in FIG. 9, the portions corresponding to these parts. A reason that such a member having a different shape is provided as described above will be described later with reference to FIG. 24.

As illustrated in FIGS. 10 to 12, the slider 136 includes such protrusions 139 which protrude leftward and rightward.

As illustrated in FIG. 11, in the slider 136, there are formed vertical part 133, horizontal slider parts 134 and 135, and inclined slider part 138.

As illustrated in FIG. 12, the horizontal slider part 134 comes into contact with the horizontal member part 144, the horizontal slider part 135 comes into contact with the horizontal member part 149, and the vertical parts 133 comes into contact with the side surface 148*b*, respectively.

Figure 13:
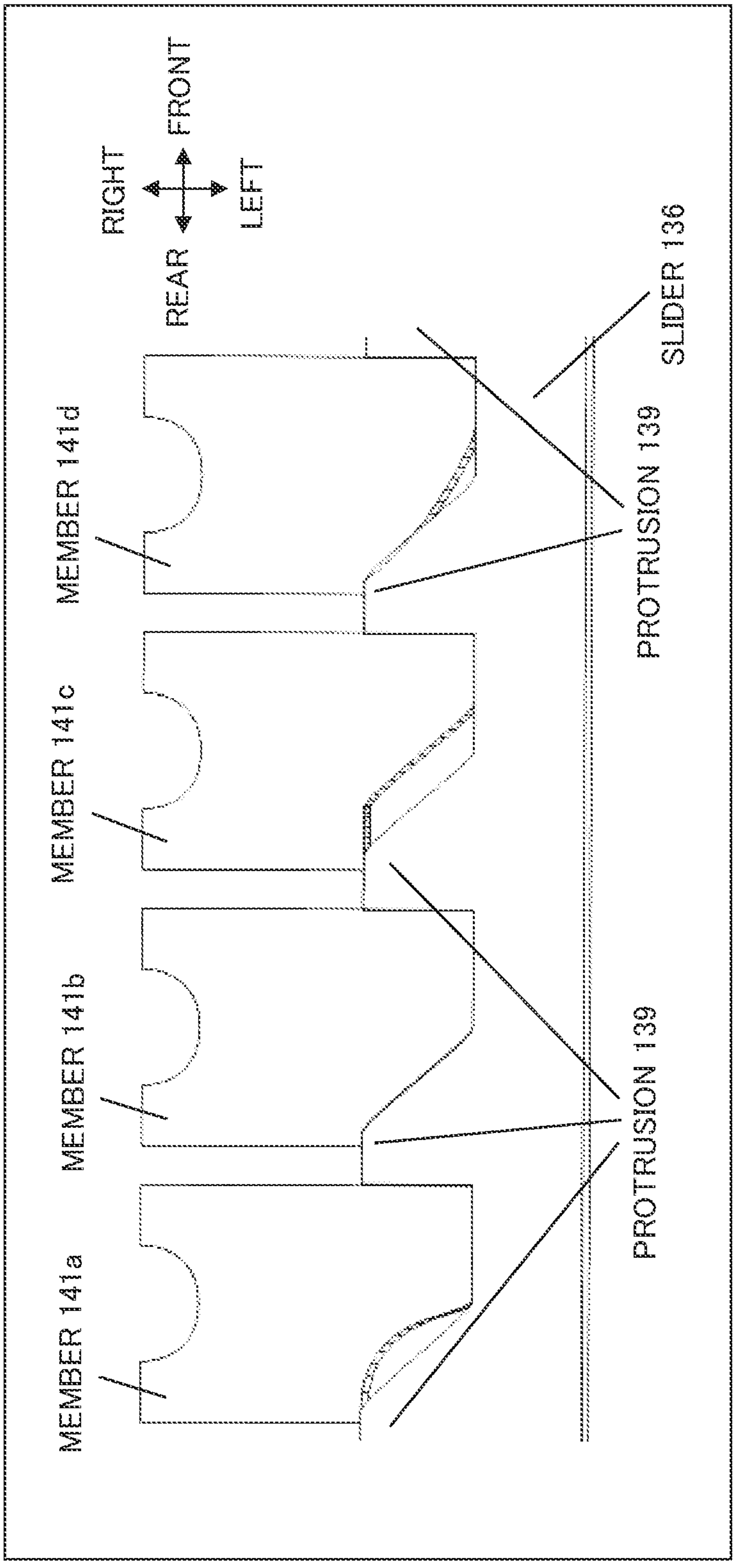
FIG. 13 is a diagram illustrating how each of the members come into contact with the slider.

FIG. 13 is a diagram illustrating how each of the members illustrated in FIG. 9 comes into contact with the slider 136. As illustrated in FIG. 13, depending on the shapes of the horizontal member parts and inclined member parts of the members, these members are different from one another in how to come into contact with the slider 136.

All the members to be installed left and right of the slider 136 may be the members 141 illustrated in FIG. 7, or may be the members 141*n* illustrated in FIG. 8.

FIG. 14 is a schematic diagram illustrating the substrate 301 that is an example of the substrate assumed to be attached to the connector 101 illustrated in FIGS. 3 and 4.

The substrate 301 includes a substrate part 302 and the terminal part 306.

On the substrate part 302, a predetermined circuit (not illustrated) is formed. At least a part of the circuit is connected to terminals 307.

The terminals 307 are formed on the terminal part 306. Though not illustrated, terminals corresponding to the terminals 307 are also formed on a back side of the terminal part 306. At least a part of a plurality of the terminals 307 is connected to the circuit formed on the substrate part 302. Each of the terminals 307 is assumed to come into contact with each of the electrodes 106 illustrated in FIGS. 3 and 4.

The recess 303*a* is provided on a rear end of the terminal part 306, and the recess 303*b* is provided on a front end of the terminal part 306.

The recess 303*a* is a portion into which the first protrusion 126 illustrated in FIGS. 3 and 4 fits when the terminal part 306 is properly attached to the connector 101 as will be described later with reference to FIG. 25. The recess 303*b* is a portion into which a protruding portion of the second protrusion 121 illustrated in FIGS. 3 and 4 fits, the protruding portion being invisible in FIGS. 3 and 4, when the terminal part 306 is properly attached to the connector 101 as will be described later with reference to FIG. 25. This protruding portion is formed on a back side of the second protrusion 121 illustrated in FIGS. 3 and 4.

A description will be given below of an operation and the like of each of the portions of the connector 101 at the time of attaching the substrate 301 illustrated in FIG. 14 to the connector 101 illustrated in FIGS. 3 and 4.

Figure 15:
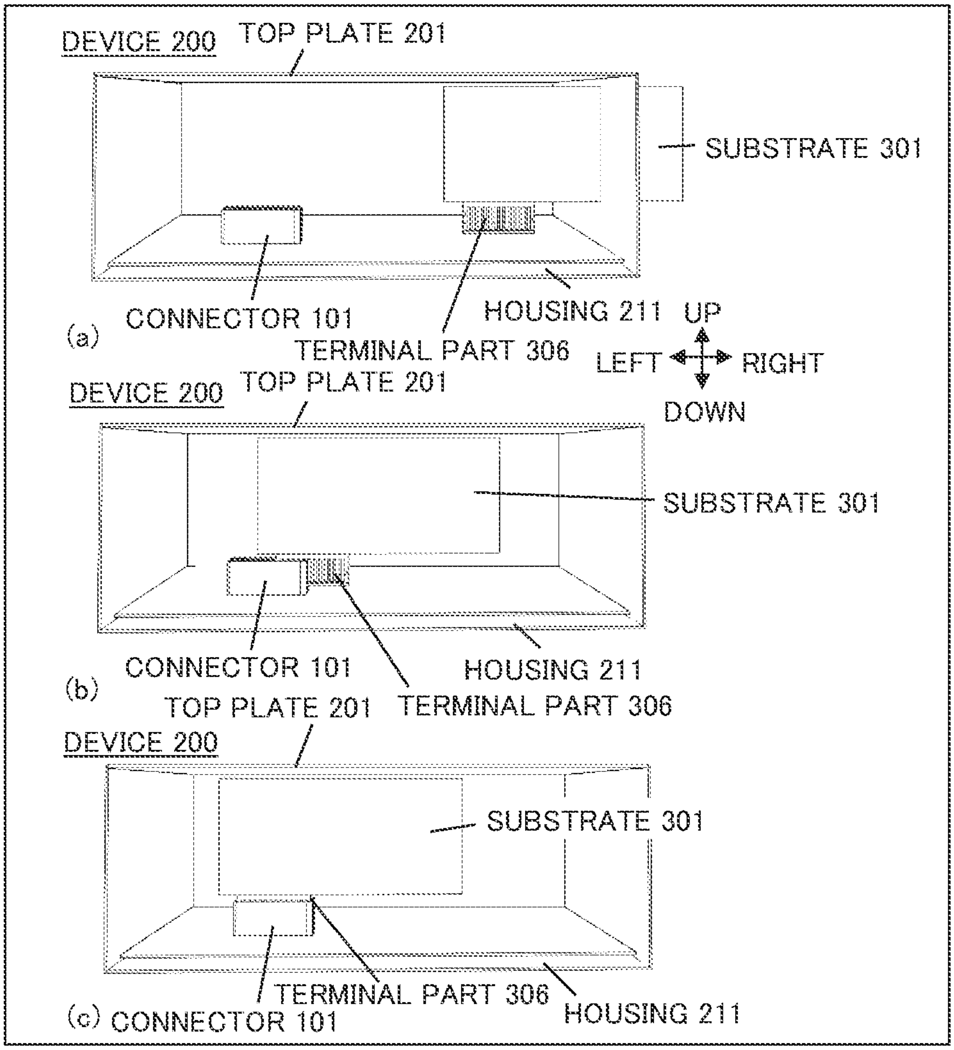
FIG. 15 is schematic diagrams illustrating a state where the substrate is attached to the connector according to the present example embodiment.

FIG. 15 is schematic diagrams illustrating a state where the terminal part 306 of the substrate 301 is attached to the connector 101.

On a right side surface of the housing 211, an insertion opening for inserting the substrate 301 into the housing 211 is formed. In FIG. 15, illustration of the insertion opening is omitted. In the insertion opening, for example, a sensor (not illustrated) that detects whether the substrate is inserted is installed.

When the sensor detects that the substrate 301 is inserted into the insertion opening, for example, a drive unit (not illustrated) is driven, and by this drive, rotates the rotating part 122 in the direction of the arrow 921*a* illustrated in FIGS. 4 and 5. By this rotation, the second protrusion 121 illustrated in FIGS. 3 4 is located at a position of not blocking the insertion opening 131. A state illustrated in FIG. 15(*a*) is such a state.

Then, through a state in FIG. 15(*b*), the terminal part 306 is attached to the connector 101 as in FIG. 15(*c*). When the insertion of the substrate 301 to a predetermined position of the housing 211 is completed, the sensor detects the completion. The substrate 301 is attached with, for example, a mark indicating that the insertion of the substrate 301 to the predetermined position of the housing 211 is completed. In that case, if the sensor is an optical sensor, the sensor detects the mark, thereby determining that the insertion of the substrate 301 to the predetermined position of the housing 211 is completed.

Then, the drive unit rotates the rotating part 122 in an opposite direction of the arrow 921*a* illustrated in FIGS. 4 and 5. By this rotation, the second protrusion 121 is located at a position of blocking the insertion opening 131 illustrated in FIGS. 3 and 4.

Figure 16:
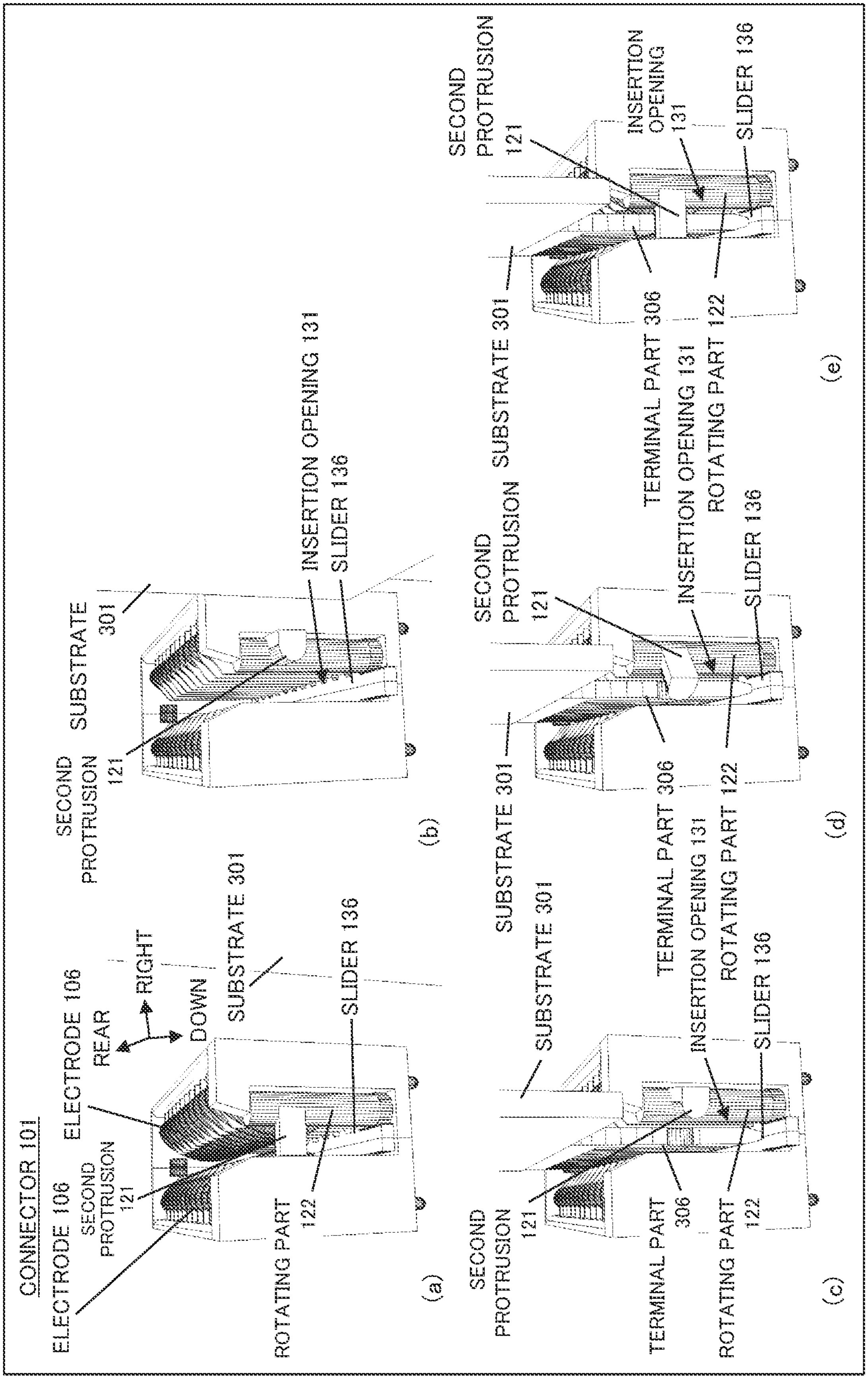
FIG. 16 is diagrams illustrating an outline of an operation of the connector at the time of inserting the substrate into a housing.

FIG. 16 is schematic diagrams illustrating an outline of an operation of the connector 101 at the time of inserting the substrate 301 illustrated in FIG. 14 into the housing 211 illustrated in FIG. 15.

A state in FIG. 16(*a*) is a state immediately after the substrate 301 is inserted into the housing 211.

Thus, the sensor that is described in the explanation of FIG. 15 and is not illustrated in FIG. 15 detects that the substrate 301 is inserted into the housing 211. Then, for example, the above-mentioned drive unit drives the motor according to a signal from the sensor, and rotates the rotating part 122 in the direction of the arrow 921*a* illustrated in FIGS. 4 and 5. In this state, the slider 136 is pulled out to the proximal side, and following this, a gap for inserting the terminal part 306 of the substrate 301 is formed above the slider 136. Details of an operation of forming the gap will be described later.

In a state illustrated in FIG. 16(*b*), as a result of rotating the rotating part 122 in the direction of the arrow 921*a* illustrated in FIGS. 4 and 5, the second protrusion 121 comes to the position of not blocking the insertion opening 131. In this state, the slide is pulled out to the proximal side, and following this, a gap for inserting the terminal part 306 of the substrate 301 is formed above the slider 136.

FIG. 16(*c*) illustrates a state where the terminal part 306 of the substrate 301 is inserted into the gap.

When the terminal part 306 is properly inserted into the gap, the sensor sends, to the drive unit, a signal indicating that the terminal part 306 is properly inserted. The drive unit that has received the sent signal causes the rotating part 122 to start rotation in the opposite direction of the arrow 921*a* illustrated in FIGS. 4 and 5.

FIG. 16(*d*) illustrates a state where the second protrusion 121 closes to some extent by the rotation of the rotating part 122, which is opposite to the direction of the arrow 921*a* illustrated in FIG. 4 and FIG. 5. The slider 136 slides backward in conjunction with the rotation of the rotating part 122.

FIG. 16(*e*) illustrates a state where the second end 108 closes the insertion opening 131 by the rotation of the rotating part 122. In this state, the slider 136 returns to the position illustrated in FIG. 16(*a*) in conjunction with the rotation of the rotating part 122.

Figure 17:
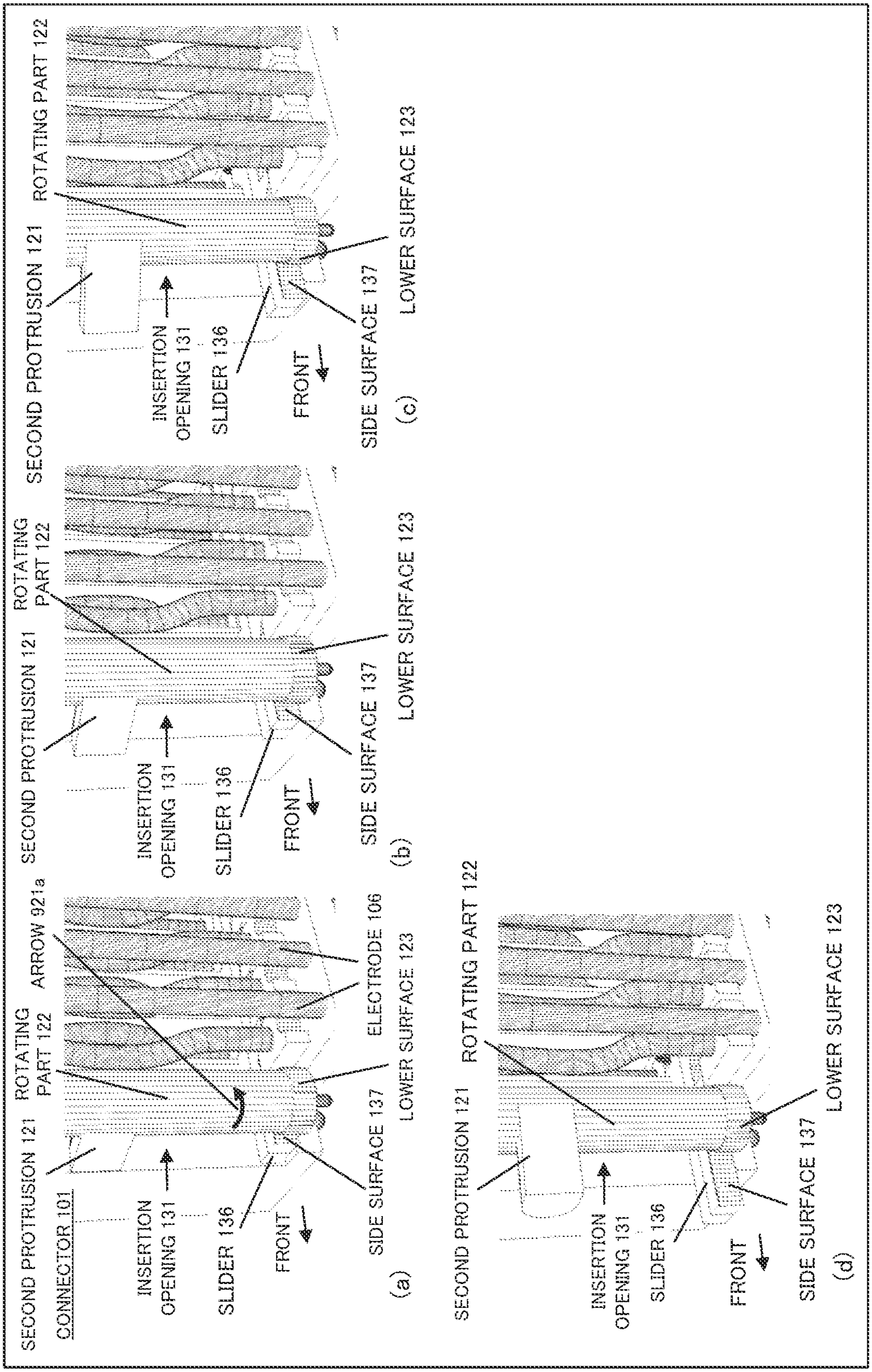
FIG. 17 is diagrams illustrating an enlarged view of a vicinity of a lower part of the rotating part.

FIG. 17 is diagrams illustrating the operations in FIGS. 16(*a*) to 16(*c*) by enlarging a vicinity of a lower part of the rotating part 122.

As described with reference to FIG. 5, the teeth are formed on the lower surface 123 of the rotating part 122. Teeth are also formed on the side surface 137 of the slider 136. Then, the teeth of the lower surface 123 and the teeth of the side surface 137 mesh with each other.

Therefore, when the rotating part 122 rotates in the direction of the arrow 921*a* illustrated in FIG. 17(*a*), the slider 136 slides forward in conjunction with such a motion. When the rotating part 122 rotates opposite to the arrow 921*a* illustrated in FIG. 17(*a*), the slider 136 slides backward in conjunction with such a motion.

Figure 18:
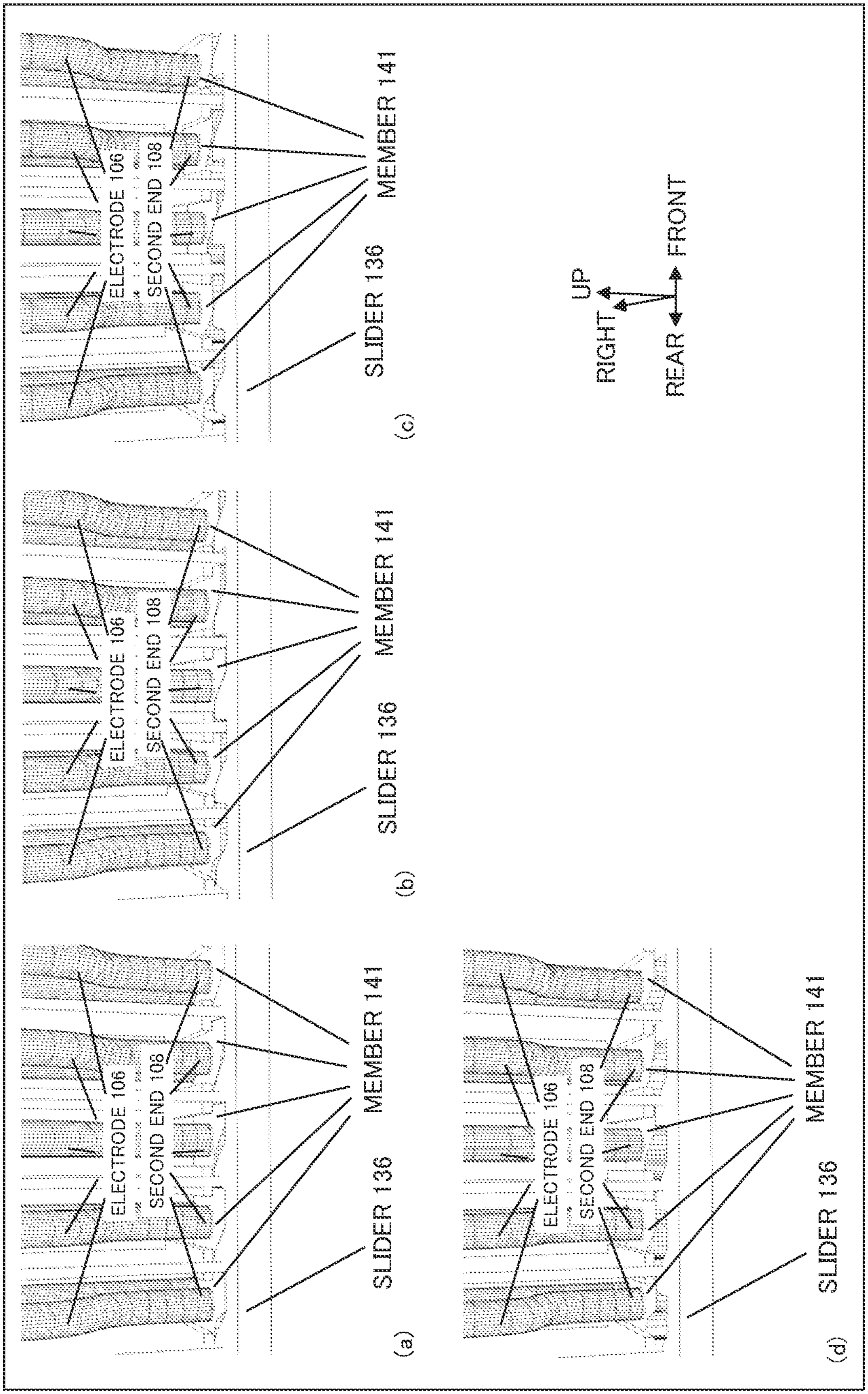
FIG. 18 is diagrams illustrating a motion the members and electrodes, the motion following a forward slide of the slider.

FIG. 18 is diagrams illustrating motions of the members 141 and the electrodes 106, the motions following the forward slide of the slider 136, which is illustrated in FIG. 17.

FIG. 18(*a*) is the same diagram as FIG. 6(*b*).

From a state illustrated in FIG. 18(*a*), the slider 136 slides forward illustrated in FIG. 18.

Then, the inclined member parts 143 of the members 141, which are illustrated in FIG. 12, are pushed by the inclined slider parts 138 of the slider 136, which are illustrated in FIG. 12. At this time, since the partitions 116 illustrated in FIG. 6(*d*) are present next to each of the members 141, the members 141 do not move forward and backward illustrated in FIG. 6(*d*), but slide rightward.

An amount of the slide becomes larger as a state in FIG. 18(*d*) is approached, and becomes largest in the state of FIG. 18(*d*).

The second ends 108 of the electrodes 106 are secured to the members 141. Therefore, the second ends 108 move rightward by an amount corresponding to the amount of slide of the members 141. Following this movement, portions of the electrodes 106, which are above the second ends 108, also move right ward.

Figure 19:
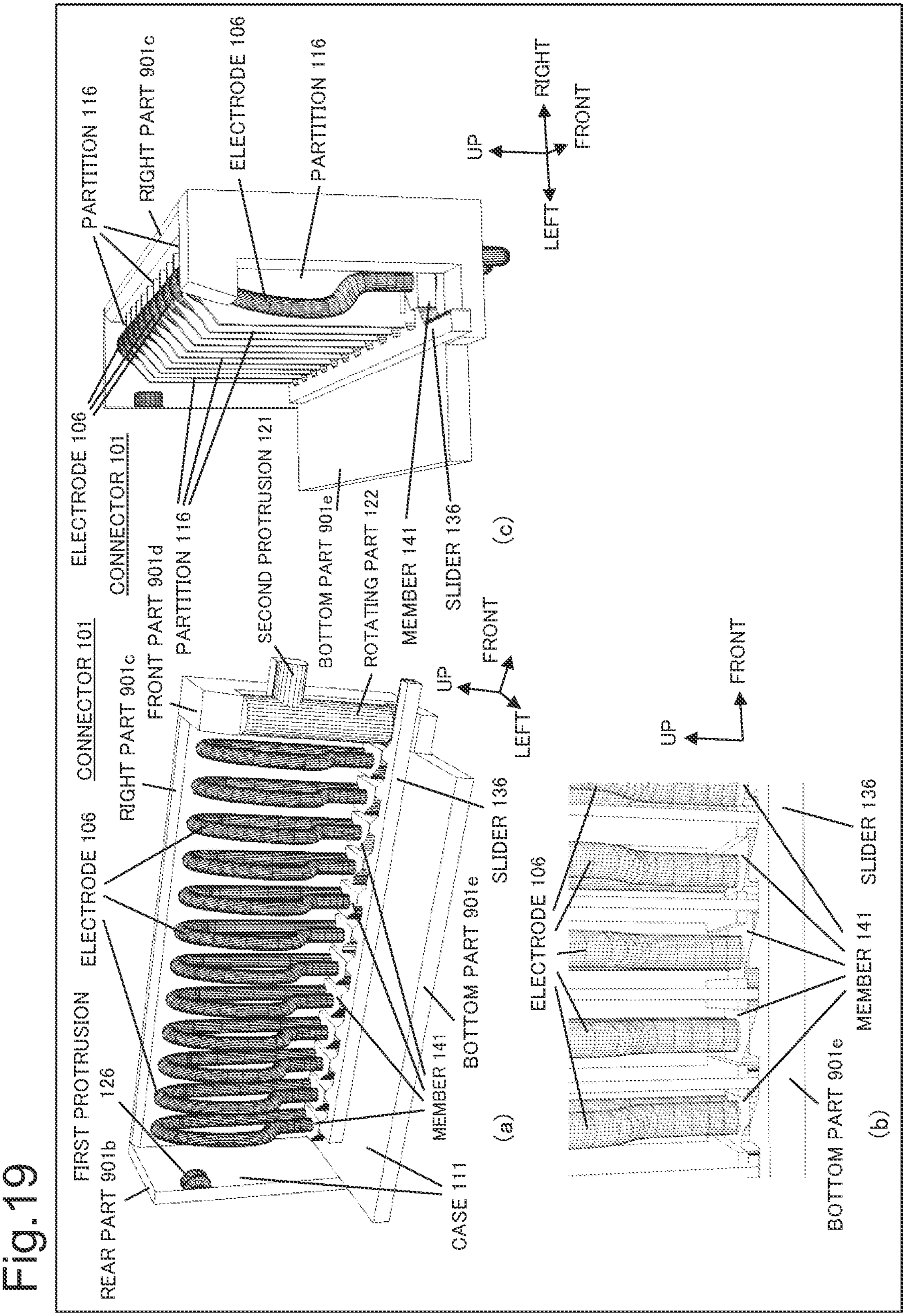
FIG. 19 is detailed diagrams illustrating a state in FIG. 18(*d*).

FIG. 19 is detailed diagrams illustrating a state of the connector 101, which corresponds to FIG. 18(*d*).

FIG. 19(*a*) is a perspective diagram illustrating a portion in a state of FIG. 18(*d*), the portion corresponding to FIG. 6(*a*). FIG. 19(*b*) is the same diagram as FIG. 18(*d*). FIG. 19(*c*) is a perspective diagram illustrating a portion in the state of FIG. 18(*d*), the portion corresponding to FIG. 6(*c*).

In a state illustrated in FIG. 19(*b*), as illustrated in FIG. 19(*c*), the left edge of each of the electrodes 106 is retreated rightward more than the left edge of each of the partitions 116. Hence, even if the terminal part 306 of the substrate 301 is inserted in the state illustrated in FIG. 19 as illustrated in FIG. 16(*c*), each of the terminals of the terminal part 306 does not come into contact with the electrode 106. As described above, at the time of inserting the terminal part 306 into the connector 101, each of the terminals of the terminal part 306 is prevented from coming into contact with the electrode 106, whereby an operation failure caused by contact of the terminal of the terminal part 306 with an unexpected electrode can be avoided. For example, the operation failure is damage to the circuit on the substrate connected to a terminal that should not be supplied with power, the damage being caused by supply of power to the terminal.

Figure 20:
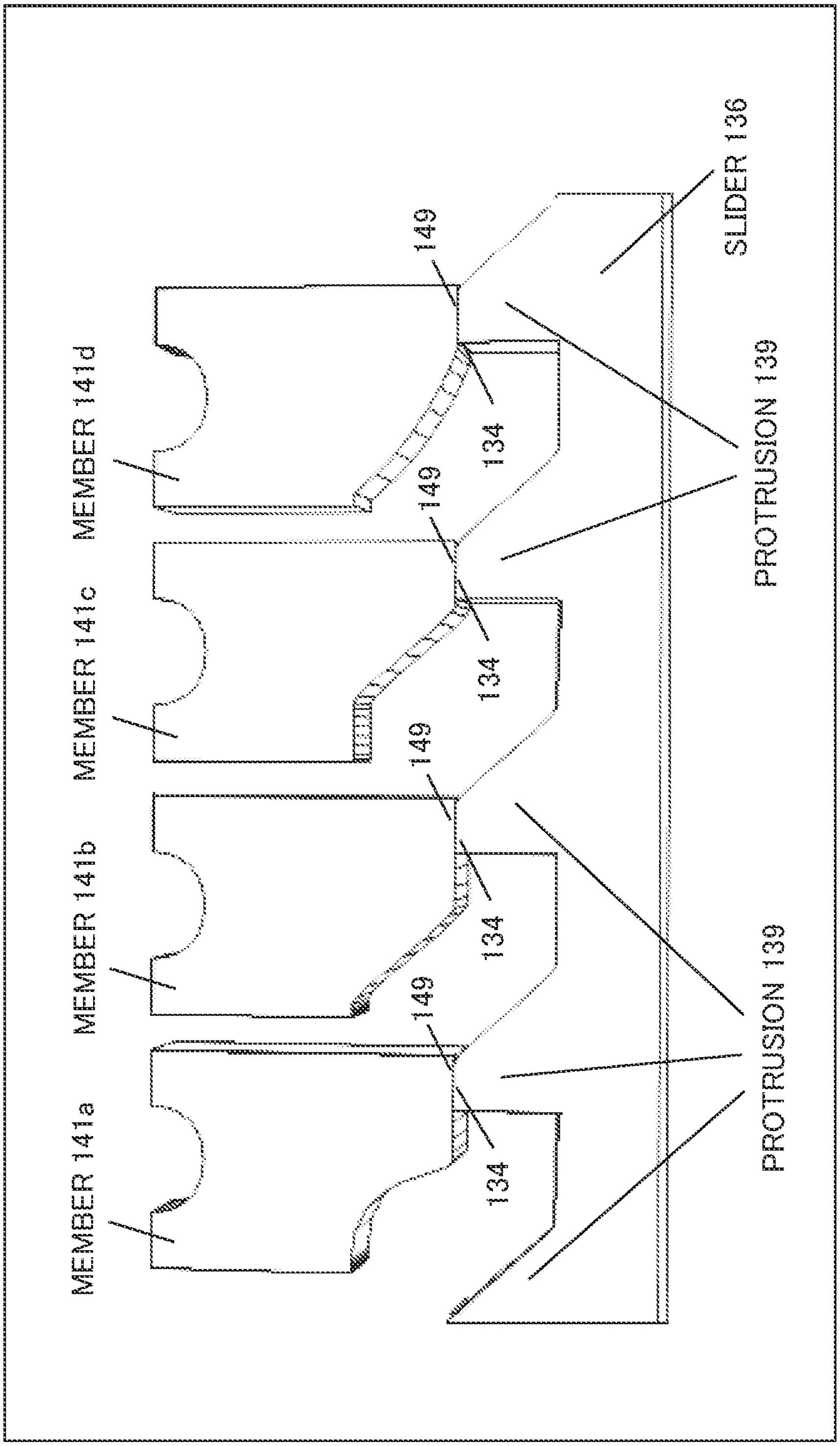
FIG. 20 is a diagram illustrating positional relationship between the slider and the members.

FIG. 20 is diagrams illustrating positional relationship between the slider 136 and the members 141 in the state illustrated in FIG. 19 when each of the members illustrated in FIG. 9 is used as the members 141.

In a state illustrated in FIG. 20, whichever of the members 141*a* to 141*d* the members 141 may be, the horizontal member parts 149 are in contact with the horizontal slider parts 134 of the protrusions 139 of the slider 136.

Figure 21:
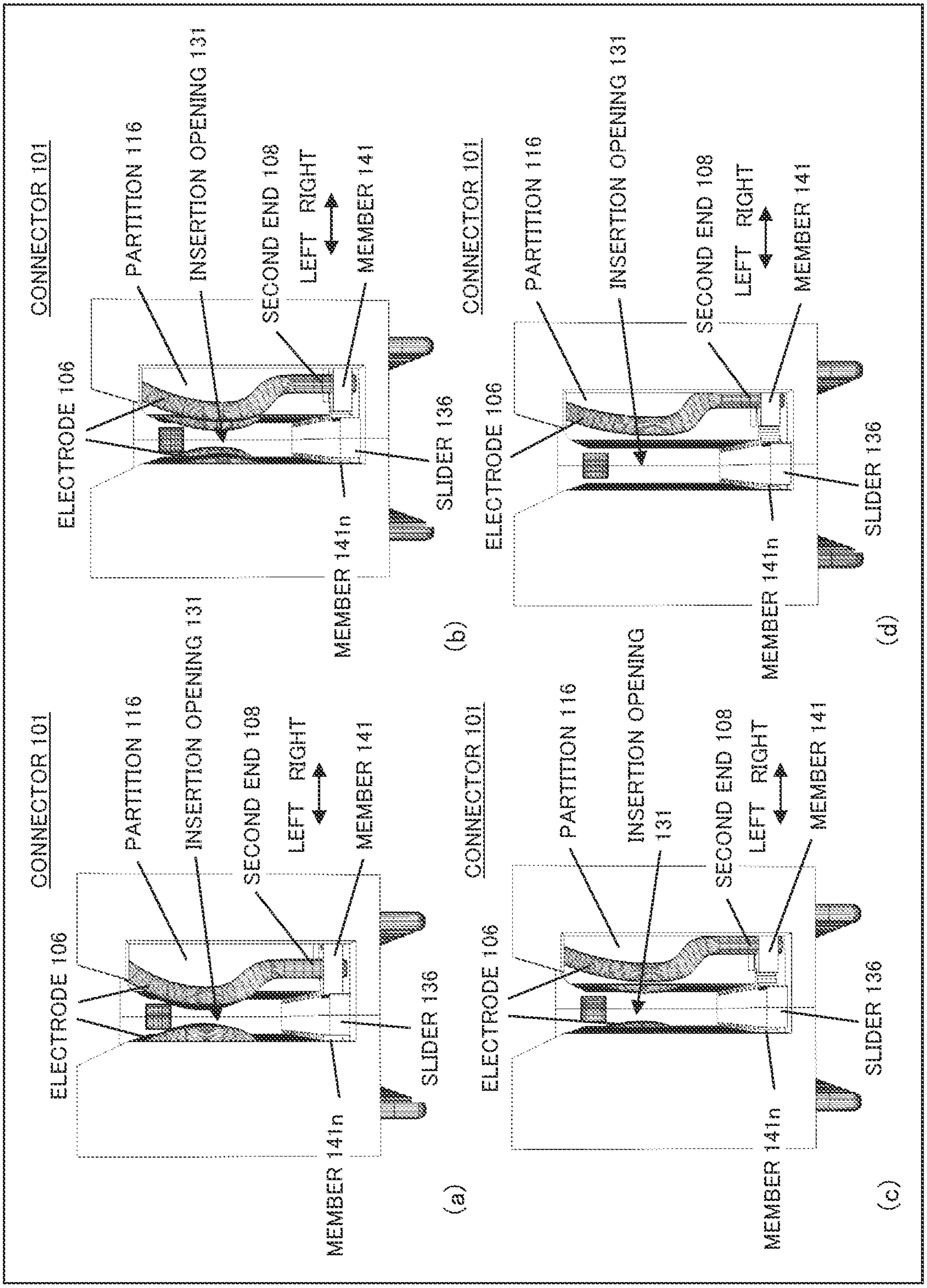
FIG. 21 is diagrams illustrating motions of the electrodes that is caused by a forward slide of the slider.

FIG. 21 is diagrams illustrating motions of the electrodes 106, which are caused by that the slider 136 moves forward as illustrated in FIG. 18.

When the slider 136 slides to the proximal side from a state of FIG. 21(*a*) toward a state of FIG. 21(*d*), left edges of the electrodes 106 on the right side from the center are accommodated more on the right side than left edges of the right partitions 116. Right edges of the electrodes 106 on the left side from the center are accommodated more on the left side than right edges of the left partitions 116. Thus, in the state illustrated in FIG. 21(*d*), the electrodes 106 are hidden behind the partitions 116, and are invisible from the insertion opening 131. This means that, even if the terminal part 306 of the substrate 301 is inserted in the state illustrated in FIG. 21 as illustrated in FIG. 16(*c*), each of the terminals of the terminal part 306 does not come into contact with the electrode 106. As described above, at the time of inserting the terminal part 306 into the connector 101, each of the terminals of the terminal part 306 is prevented from coming into contact with the electrode 106, whereby an operation failure caused by contact of the terminal of the terminal part 306 with an unexpected electrode can be avoided. For example, the operation failure is damage to the circuit on the substrate connected to a terminal that should not be supplied with power, the damage being caused by supply of power to the terminal.

Figure 22:
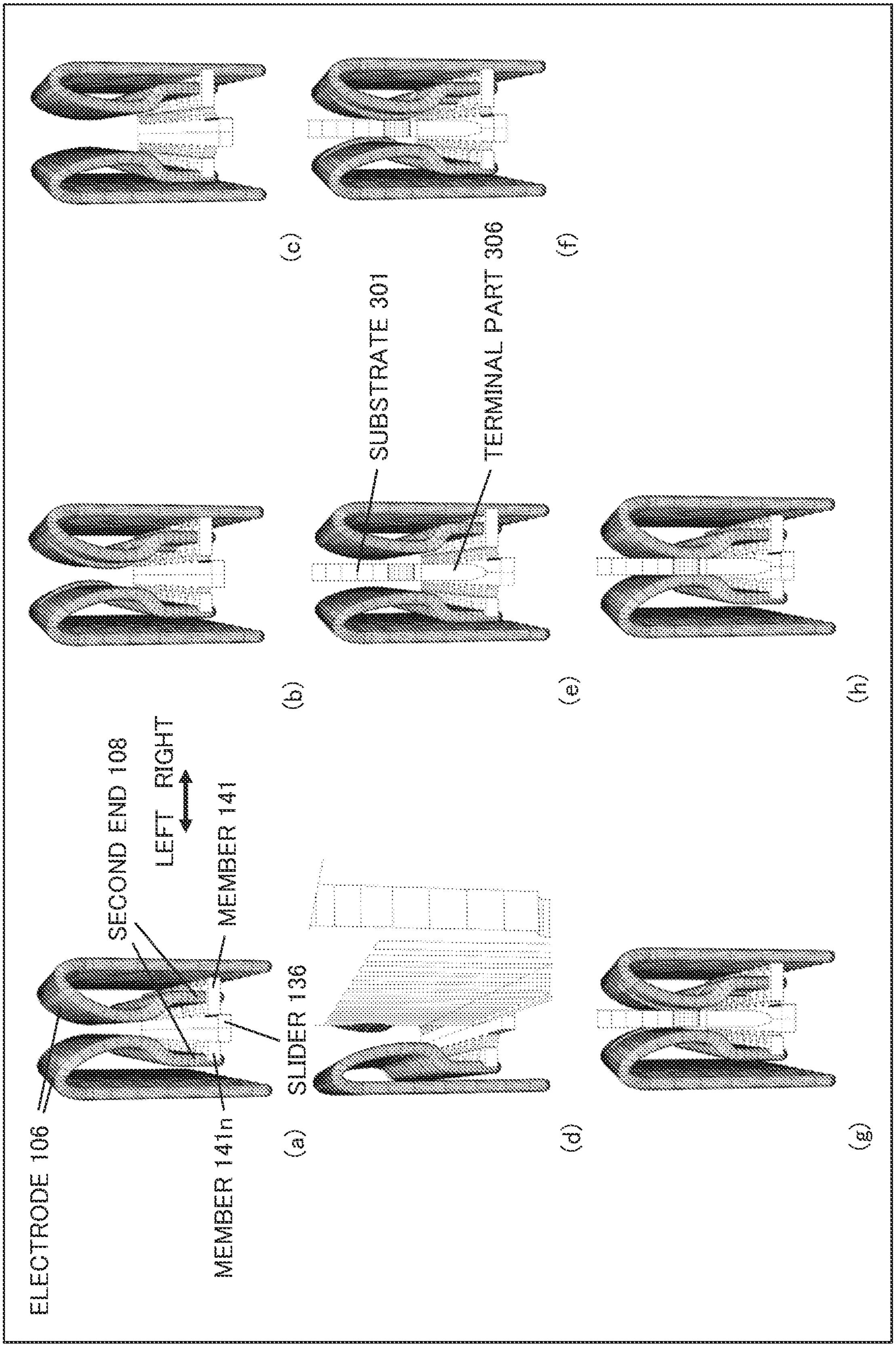
FIG. 22 is diagrams illustrating each of the motions of the electrodes.

FIG. 22 is diagrams illustrating each motion of the electrodes 106 when the operation illustrated in FIG. 16 is performed. In FIG. 22, in order to make it easy to see the motions of the electrodes 106, only the electrodes 106, the slider 136, and the members 141 and 141*n* are illustrated.

FIG. 22(*a*) illustrates the state illustrated in FIGS. 3 to 6 and FIG. 21(*a*).

As the state illustrated in FIG. 22(*a*) shifts to states illustrated in FIGS. 22(*b*), 22(*c*) and 22(*d*), the slider 136 slides forward. Following the slide, the members 141 slide rightward. The members 141*n* move leftward. The members 141 and 141*n* slide, thereby gradually increases an interval between the left edges of the electrodes 106 on the right side from the center and the right edges of the electrodes 106 on the left side from the center.

Then, in the state of FIG. 22(*d*) where the interval increases most, insertion of the terminal part 306 of the substrate 301 into the interval is performed.

Then, when the insertion of the terminal part 306 of the substrate 301 into the interval is completed in the state of FIG. 22(*e*), the slider 136 slides backward.

Thus, the members 141 slide leftward by restoring force of the electrodes 106, which have elasticity. The members 141*n* move rightward. The members 141 and 141*n* slide, whereby gradually decreases the interval between the left edges of the electrodes 106 on the right side from the center and the right edges of the electrodes 106 on the left side from the center, and the electrodes 106 come into contact with each of the terminals of the terminal part 306. In a state in FIG. 22(*h*), the contact is completed. In the state in FIG. 22(*h*), each constituent of the connector 101 returns to the state illustrated in FIGS. 3 to 6.

In the above-mentioned description regarding FIG. 6, it is described that the fourth member 141 from the front, which is illustrated in FIG. 6(*a*), is different in shape from the other members 141. The fourth member 141 from the front, which is illustrated in FIG. 6, is the member 141*c* illustrated in FIG. 13, and the other members 141 are each the member 141*b* illustrated in FIG. 13. A description will be given below of the reason that the fourth member 141 from the front is different in shape from the other members 141.

Figure 23:
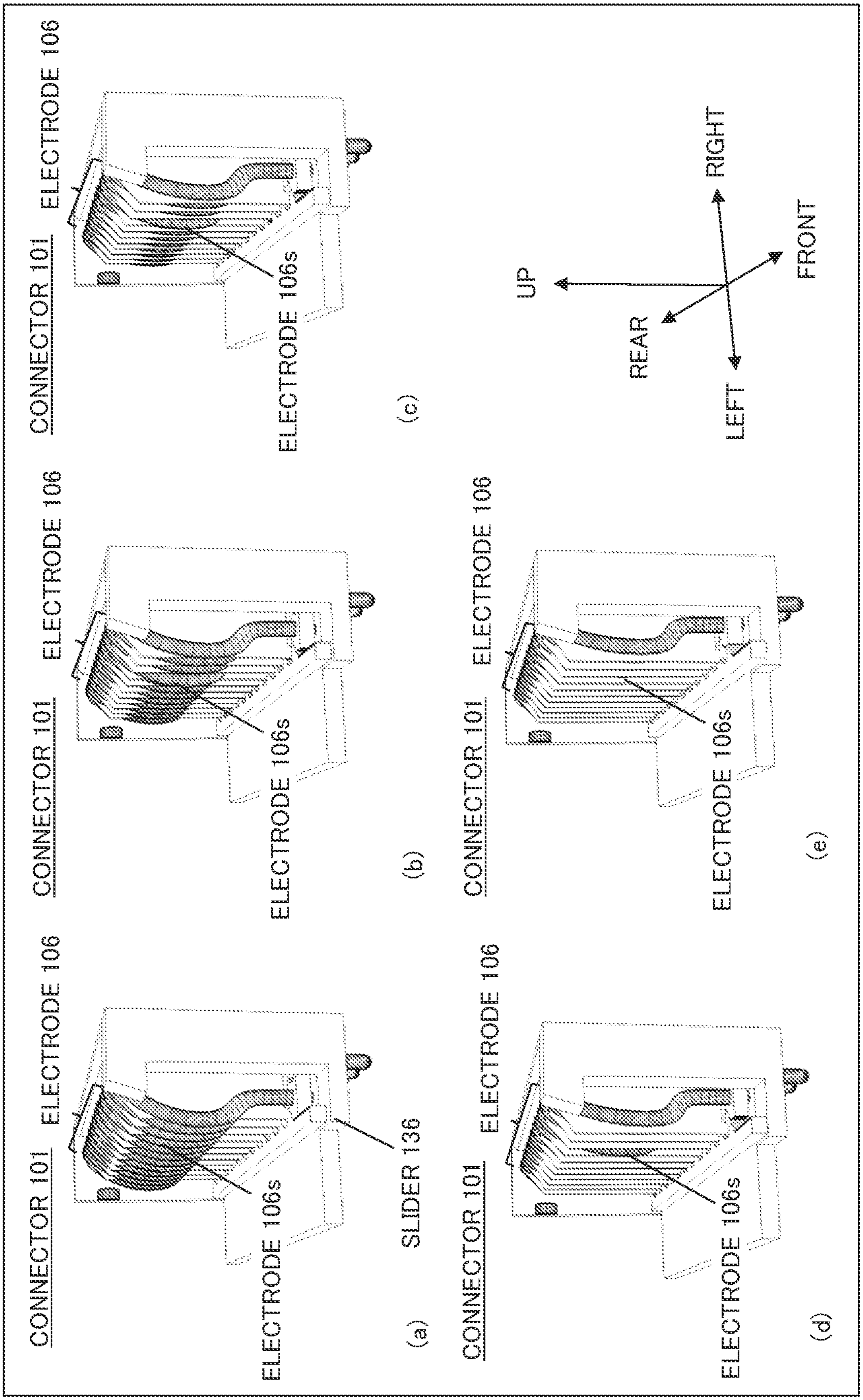
FIG. 23 is diagrams illustrating a difference in motion between an electrode in which a second end is secured to a fourth member from the front and other electrodes.

FIG. 23 is diagrams illustrating a difference in operation between the electrode in which the second end 108 illustrated in FIG. 6(*b*) is secured to the fourth member 141 from the front, which is illustrated in FIG. 6(*a*), and the other electrodes 106.

FIG. 23(*a*) is a diagram corresponding to FIG. 6(*c*). A state of FIG. 23(*a*) shifts to states of FIGS. 23(*b*), 23(*c*), 23(*d*) and 23(*e*) following the forward movement of the slider 136 illustrated in FIG. 17. In the state of FIG. 23(*a*), as illustrated in FIG. 6(*c*), the left edges of all the electrodes 106 are located leftward of the left edges of the partitions 116. Further, in the state of FIG. 23(*e*), as illustrated in FIG. 19(*c*), the left edges of all the electrodes 106 are located rightward of the left edges of the partitions 116.

In the states in FIGS. 23(*b*) to 23(*d*), a position of the left edge of each of the electrodes 106 is between a position thereof in FIG. 23(*a*) and a position thereof in FIG. 23(*e*).

As illustrated in FIGS. 23(*b*) to 23(*d*), rightward movement of a left edge of an electrode 106*s* that is the fourth electrode 106 from the front lags behind rightward movement of the other electrodes 106. A reason that the rightward movement of the left edge of the electrode 106*s* lags will be described later with reference to FIG. 24.

States of the movement of the left edge of each of the electrodes 106 after the terminal 306 of the substrate 301 is attached to the connector 101 are in order of FIGS. 23(*e*), 23(*d*), 23(*c*), 23(*b*) and 23(*a*). The rightward movement of the left edge of the electrode 106*s* at that time is performed earlier than the movement of the other electrodes. This means that the electrode 106*s* can be used as a precharge electrode. The precharge electrode is an electrode for supplying power in advance to a predetermined terminal of the terminal part 306 of the substrate 301.

An operation of the precharge is performed after the terminal part 306 of the substrate 301 is properly attached to the connector 101.

When the terminal part 306 of the substrate 301 is properly attached to the connector 101 as illustrated in FIG. 16(*c*), the slider 136 slides backward between FIG. 16(*c*) and FIG. 16(*e*). Then, the positions of the left edges of the electrodes 106 illustrated in FIG. 23 sequentially shift from that illustrated in FIG. 23(*e*) to those illustrated in FIGS. 23(*d*), 23(*c*), 23(*b*) and 23(*a*). At this time, the electrode 106*s* comes into contact with the corresponding terminal of the terminal part of the substrate earlier than the other electrodes 106. When the electrode 106*s* is the precharge electrode, this terminal is thereby supplied with power before the other terminals are connected to the respective electrodes 106.

In the configuration illustrated in FIG. 10, a position where the member 141*c* is used is selected, and can thereby a position of the precharge electrode can be selected.

In the connector 101, timing when the precharge is performed can be adjusted by changing the shape of the members 141. The adjustment can be performed, for example, by changing a length of the horizontal member part 144 illustrated in FIG. 7. In that case, the longer the length of the horizontal member part 144 is, the earlier the precharge can be performed.

Figure 24:
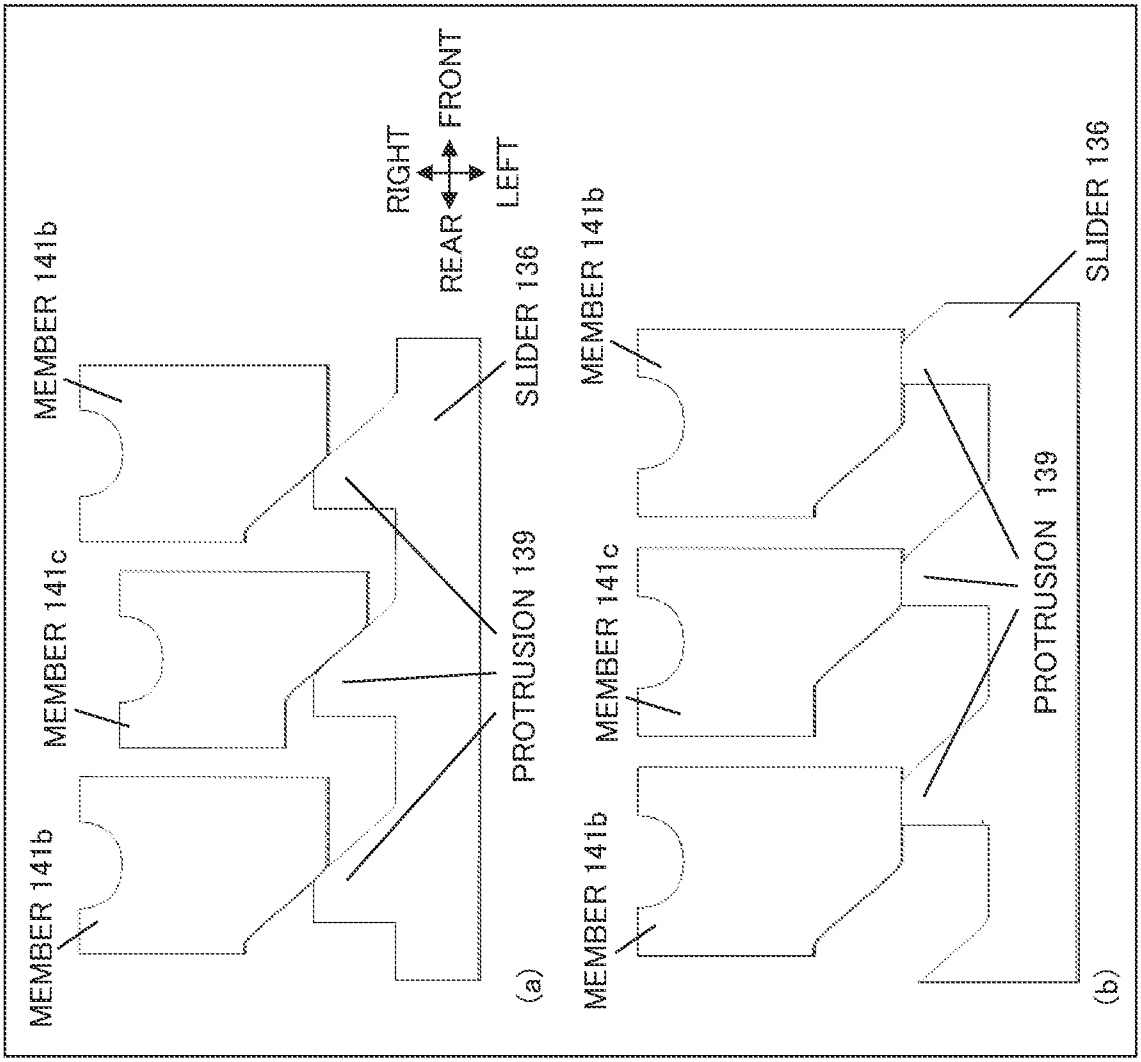
FIG. 24 is diagrams illustrating a difference in timing of sliding between the members, the difference being caused by a difference in shape between the members.

FIG. 24 is diagrams illustrating a difference in timing of sliding between the members 141, the difference being caused by the difference in shape between the members 141. Members 141*b* and 141*c* illustrated in FIG. 24 are the members 141*b* and 141*c* illustrated in FIG. 13.

When the slider 136 moves forward to some extent from a state corresponding to the state illustrated in FIG. 13, each of the members turn to a state illustrated in FIG. 24(*a*). In this state, an amount of rightward slide of the member 141*c* is smaller in comparison with an amount of rightward slide of the members 141*b*. This is because the horizontal member part 144 illustrated in FIG. 7 is larger in the member 141*c* than in the members 141*b*, and the member 141*c* requires a longer time for the inclined member part 143 to first come into contact with the inclined slider part 138 illustrated in FIG. 11.

Thereafter, when a state illustrated in FIG. 24(*b*) comes, rightward movement amounts of the members 141*b* and the member 141*c* become the same.

The fourth electrode 106 from the front, which is illustrated in FIGS. 23(*b*) to 23(*d*) is connected to the member 141*c*. Therefore, a delay of the movement of the member 141*c* illustrated in FIG. 24(*a*) at a stage of FIG. 24(*a*) with respect to the movement of the members 141*b* brings about a delay of the rightward movement of the electrode 106*s* illustrated in FIG. 23.

On the contrary, when the state of FIG. 24(*b*) shifts to the state of FIG. 24(*a*), a leftward movement amount of the member 141*c* is larger than a leftward movement amount of the members 141*b*. Therefore, the electrode 106 connected to the member 141*c* moves leftward earlier, whereby the above-mentioned precharge is enabled.

Figure 25:
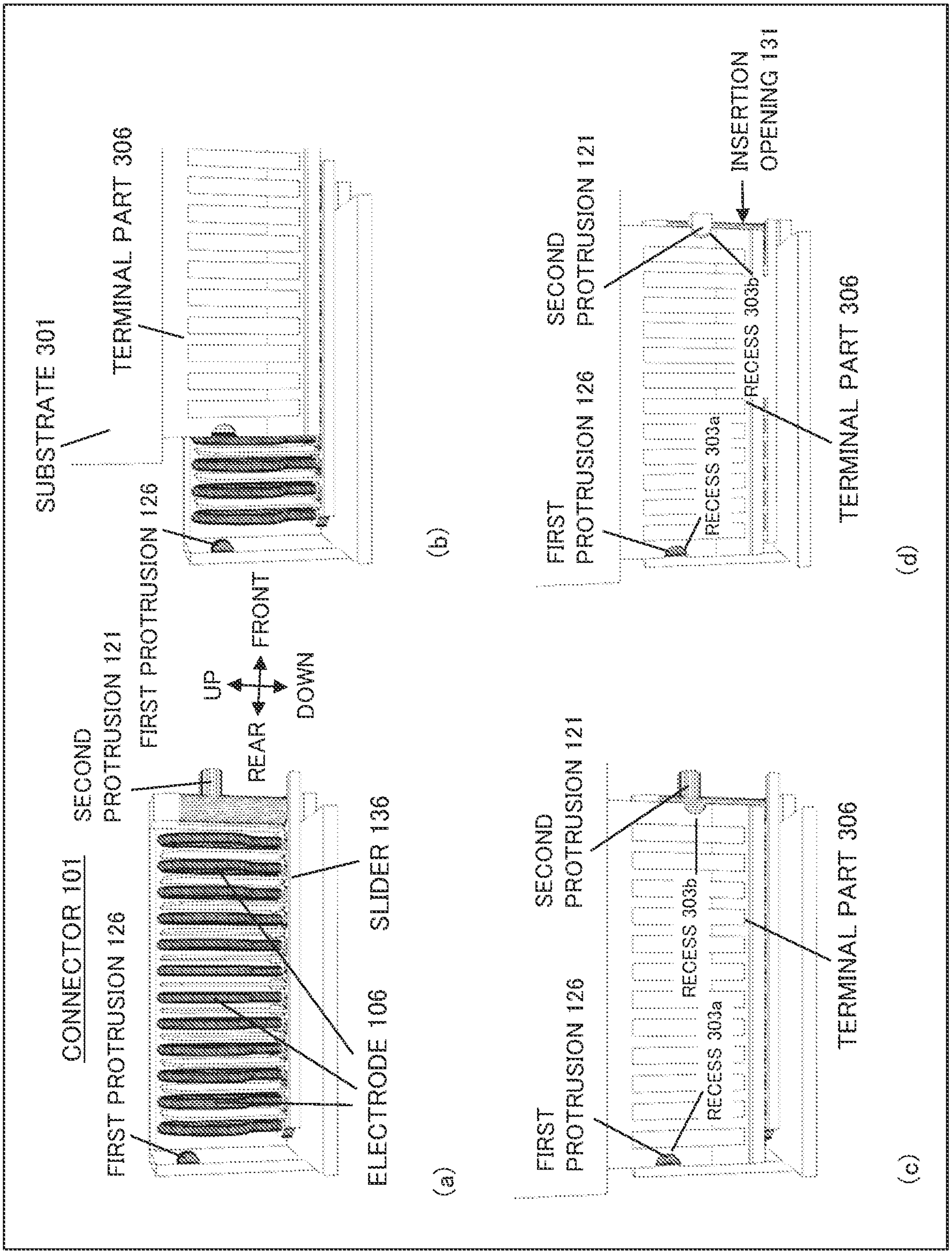
FIG. 25 is diagrams illustrating actions of a first protrusion and a second protrusion when a substrate terminal part is inserted into the connector.

FIG. 25 is diagrams illustrating actions of the first protrusion 126 and the second protrusion 121 when the terminal part 306 of the substrate 301 is inserted into the connector 101 illustrated in FIGS. 3 and 4.

FIG. 25(*a*) illustrates a state where the left and right electrodes 106 illustrated in FIG. 21 are spatially separated from each other, the state being illustrated in FIG. 17(*d*), FIG. 18(*d*), FIG. 19, and FIG. 21(*d*).

In this state, the terminal part 306 of the substrate 301 is inserted into the connector 101 as illustrated in FIG. 25(*b*). Thereafter, when a height position of the terminal part 306 at the time of insertion thereof is proper, then as illustrated in FIG. 25(*c*), the first protrusion 126 fits into a recess 303*a* of the terminal part 306. The recess 303*a* corresponds to the recess 303*a* illustrated in FIG. 14.

Thereafter, when the rotating part 122 rotates opposite to the arrow 921*a* illustrated in FIG. 17(*a*), and the second protrusion 121 blocks the insertion opening 131 as illustrated in FIG. 25(*d*), a protrusion side of the second protrusion 121 fits into the recess 303*b* of the terminal part 306.

Either a case where the first protrusion 126 does not fit into the recess 303*a* or a case where the second protrusion 121 does not fit into the recess 303*b* means that a malfunction occurs in the insertion of the terminal part 306 into the connector 101. Then, in both the case where the first protrusion 126 does not fit into the recess 303*a* and the case where the second protrusion 121 does not fit into the recess 303*b*, the second protrusion 121 does not turn to the state in FIG. 25(*d*).

Hence, detection is made as to whether the second protrusion 121 turns to the state illustrated in FIG. 25(*d*) as a result of inserting the terminal part 306 into the connector 101, whereby the worker and the like can get to know whether the terminal part 306 is properly inserted into the connector 101. For example, the detection can be performed by monitoring a rotational position of the motor that drives the rotating part 122 illustrated in FIG. 17.

In the above, description is given of the example of sliding the slider forward and backward by rotationally driving the rotating part by the drive unit and the like. However, the rotating part may be manually rotated.

The slider may be slid forward and backward directly by the drive unit and the like.

The slider may be manually slid forward and backward. In that case, a member for sliding the slider forward and backward from the outside of the device may be connected to the slider.

EFFECTS

The connector according to the present example embodiment includes the slider, the members, the electrodes, the partitions, and the case. One end of each of the electrodes is connected to the bottom surface of the case, and the other end is connected to a moving member.

When the slider slides forward, an inclined moving member surface of the member slides on each of the inclined slider surfaces formed on the slider, whereby the moving members move left and right along the partitions. Thus, contact portions of the left and right electrodes, which are portions to be in contact with the substrate terminals, are retracted left and right, and in a portion into which the substrate terminal part is to be inserted, there occurs a gap between the left and right electrodes, the gap having a width larger than a thickness of the terminal part. Thus, the insertion of the substrate terminal part and release of the insertion can be performed in a state where the electrodes are not thrust against the terminals of the terminal part. Therefore, the connector according to the present example embodiment is capable of reducing the probability of the damage to the electrodes of the connector and the terminal part of the printed substrate.

In the connector according to the present example embodiment, in some cases, the contact portions of the left and right electrodes, which are the portions to be in contact with the substrate terminals, are retracted left and right, whereby the contact portions of the electrodes are retracted more than the edges of the partitions formed adjacent to the electrodes. In that case, by the retraction of the contact portions of the electrodes, the substrate terminals can be prevented from coming into contact with the electrodes when the substrate terminal part is inserted into the connector.

Thus, the connector according to the present example embodiment is capable of preventing the operation failure caused by that each of the substrate terminals comes into contact with the unexpected electrode when the substrate terminal part is inserted into the connector.

The shape of the moving member is changed, whereby the connector according to the present example embodiment can hasten the contact of the contact portion of a predetermined electrode with the substrate terminal. In that case, the predetermined electrode is used for the precharge, whereby the precharge to a predetermined substrate terminal can be performed.

In some cases, the connector according to the present example embodiment includes, on the backside surface of the case, the first protrusion that fits into the first recess provided on the end of the substrate terminal part when the substrate terminals are attached. In that case, when the substrate terminal part is not properly attached, the end of the substrate terminal part protrudes, thus making it possible to detect that the substrate terminal part is not properly attached.

In some cases, the connector according to the present example embodiment includes the second protrusion that fits into the second recess provided on the front end of the substrate terminal part by the rotation of the rotating part around the rotating shaft when the substrate terminals are attached to the vicinity of the insertion opening. In that case, when the substrate terminal part is not properly attached, the second protrusion does not fit, thus making it possible to detect that the substrate terminal part is not properly attached.

Figure 26:
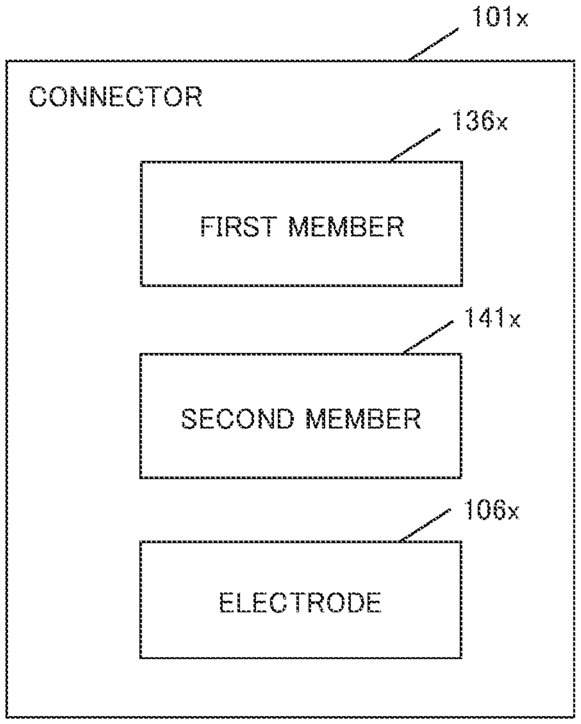
FIG. 26 is a conceptual diagram illustrating a minimum configuration of the connector according to the present example embodiment.

FIG. 26 is a conceptual diagram illustrating a configuration of a connector 101*x*, which is a minimum configuration of the connector according to the present example embodiment.

In the connector 101*x*, in first member 136*x*, an opening including a void is provided, in at least one surface perpendicular to generating lines, which are parallel to each other, of two prismatic surfaces facing each other with the void sandwiched therebetween, and in at least one surface parallel to the generating lines.

The connector 101*x* includes the first member 136*x*, a second member 141*x*, and an electrode 106*x*.

The first member 136*x* is disposed in the void, and performs a first movement that is a movement in a direction parallel to the generating lines.

Following the first member, the second member 141*x* performs a second movement between a first point and a second point that are separately predetermined, the second movement being a movement in a direction according to the direction of the movement of the first member.

The electrode 106*x* has a part secured to the second member, and does not share a point with the void except when coming into contact with the prismatic surface when the second member is located at the first point.

The electrode 106*x* does not share a point with the void except when coming into contact with the prismatic surface when the second member is located at the first point. Hence, by inserting the terminal part of the substrate into the void except for when the second member is located at the first point, a probability that the terminal rubs against a terminal electrode at the time of the insertion can be reduced.

Hence, the connector 101*x* is capable of reducing a probability of breakage of the electrode of the connector and the terminal part of the printed substrate.

Therefore, the connector 101*x* exerts the effect described in the section of [Advantageous Effects of Invention] by the above-described configuration.

The connector 101*x* illustrated in FIG. 26 is, for example, the connector 101 illustrated in FIGS. 3 to 6, FIGS. 15 to 17, FIG. 19, FIG. 21, FIG. 23 and FIG. 25.

The first member 136*x* is, for example, the slider 136 illustrated in FIGS. 3 to 6, FIGS. 10 to 13, FIGS. 16 to 22, FIG. 24, and FIG. 25.

The second member 141*x* is, for example, the member 141 illustrated in FIGS. 6, 7, 10, 12, 18, 19, 21, and 22. Alternatively, the second member 141*x* is, for example, the member 141*n* illustrated in FIGS. 8, 10, and 12. Alternatively, the second member 141*x* is, for example, the members 141*a* to 141*d* illustrated in FIGS. 9, 13, and 20.

The electrode 106*x* is, for example, the electrode 106 illustrated in FIGS. 3 to 6, FIGS. 16 to 19, FIG. 21, and FIGS. 22 to 24. Alternatively, the electrode 106*x* is, for example, the electrode 106*s* illustrated in FIG. 23.

The void is a region where the substrate terminal part is not present, the region corresponding to a region where the substrate terminal part is present when the substrate terminal part is inserted into the connector 101. The substrate terminal part is, for example, the terminal part 306 illustrated in FIGS. 14, 15, 16, 22, and 25.

For example, the prismatic surfaces are surfaces when the substrate terminal part is not inserted into the connector 101, the surfaces corresponding to surfaces of the substrate terminal part when the substrate terminal part is inserted into the connector 101.

As above, each embodiment of the present invention has been described. However, the present invention is not limited to the above-described embodiment, and can be further modified, replaced and adjusted within the scope without departing from the basic technical idea of the present invention. For example, the configuration of the elements illustrated in the drawings is an example for assisting the understanding of the present invention, and is not limited to the configuration illustrated in the drawings.

Some or all of the above example embodiment may also be described as in the following supplementary notes; however, are not limited thereto.

(Supplementary Note 1)

A connector being provided with an opening including a void, in at least one surface perpendicular to generating lines, which are parallel to each other, of two prismatic surfaces facing each other with the void sandwiched therebetween, and in at least one surface parallel to the generating lines, the connector including:

a first member that is disposed in the void and performs a first movement being a movement in a direction parallel to the generating lines;

a second member that, following the first member, performs a second movement between separately predetermined first point and second point, the second movement being a movement in a direction associated to a direction of the movement of the first member; and an electrode that has a part secured to the second member, and does not share a point with the void except where the electrode comes into contact with the prismatic surfaces when the second member is located at the first point.

(Supplementary Note 2)

The connector according to supplementary note 1, further including a first opening open to a first direction and a second opening open to a second direction different from the first direction.

(Supplementary Note 3)

The connector according to supplementary note 1 or 2, wherein the electrode is composed of a linear conductor having elasticity.

(Supplementary Note 4)

The connector according to any one of supplementary notes 1 to 3, wherein the second movement is caused by a motion that a second inclined surface formed on the second member slides on a first inclined surface formed on the first member.

(Supplementary Note 5)

The connector according to any one of supplementary notes 1 to 4, wherein the electrode includes a first end and a second end, a vicinity of the first end is secured to a second moving surface subjected to the second movement, and a vicinity of the second end is connected to the second member.

(Supplementary Note 6)

The connector according to any one of supplementary notes 1 to 5, wherein the second member is provided with a dent into which a part of the electrode fits by the second movement.

(Supplementary Note 7)

The connector according to any one of supplementary notes 1 to 6, further including a guide member that guides a direction of the second movement.

(Supplementary Note 8)

The connector according to supplementary note 7, wherein the guide member is secured to a surface subjected to the second movement.

(Supplementary Note 9)

The connector according to any one of supplementary notes 1 to 8, wherein a surface subjected to the first movement is continuous with a surface subjected to the second movement.

(Supplementary Note 10)

The connector according to any one of supplementary notes 1 to 9, wherein a surface subjected to the first movement and a surface subjected to the second movement are on a same plane.

(Supplementary Note 11)

The connector according to any one of supplementary notes 1 to 10, wherein the second member includes a first horizontal part, an inclined part connected to the first horizontal part, and a second horizontal part connected to the inclined part, the first horizontal part and the second horizontal part are substantially parallel to a direction of the first movement, and the first horizontal part is more apart from a central axis in a longitudinal direction of the first member than the second horizontal part.

(Supplementary Note 12)

The connector according to any one of supplementary notes 1 to 10, wherein a plurality of pairs of the electrode and the second member are provided.

(Supplementary Note 13)

The connector according to supplementary note 12, wherein a first second member being the second member and a second member being the second member are different in shape from each other.

(Supplementary Note 14)

The connector according to supplementary note 13, wherein the second member includes a first horizontal part, an inclined part connected to the first horizontal part, and a second horizontal part connected to the inclined part, the first horizontal part and the second horizontal part are substantially parallel to a direction of the first movement, the first horizontal part is more apart from a central axis in a longitudinal direction of the first member than the second horizontal part, and the first second member and the second member are different from each other in length of the first horizontal part.

(Supplementary Note 15)

The connector according to any one of supplementary notes 1 to 14, wherein the first movement is performed by sliding of the first member on a first surface.

(Supplementary Note 16)

The connector according to any one of supplementary notes 1 to 15, wherein the second movement is performed by sliding of the second member on a second surface.

(Supplementary Note 17)

The connector according to any one of supplementary notes 1 to 16, wherein the electrode and a predetermined terminal of the inserted substrate terminal part come into contact with each other when the second member is located at the first point.

(Supplementary Note 18)

The connector according to supplementary note 17, wherein, following the second movement, a contact part being a part subjected to the contact of the electrode performs a third movement being a movement in a direction of the second movement.

(Supplementary Note 19)

The connector according to supplementary note 17 or 18, further including a first protrusion that fits into a first recess provided on the substrate terminal part when the substrate terminal part is properly attached.

(Supplementary Note 20)

The connector according to any one of supplementary notes 17 to 19, further including a second protrusion that is secured to a rotating part that rotates around a rotating shaft installed in a vicinity of an insertion opening of the substrate terminal part, and, when the substrate terminal part is properly attached, fits into a second recess provided on the substrate terminal part.

(Supplementary Note 21)

A device including: the connector according to any one of supplementary notes 17 to 20; a circuit connected to a substrate including the substrate terminal part via the connector; and a housing in which a second insertion opening is formed, the second insertion opening being an insertion opening for inserting the substrate in order to attach the substrate terminal part to the connector.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-235118 filed on Dec. 17, 2018, the entire disclosure of which is incorporated herein in its entirety by reference.

REFERENCE SIGNS LIST

101, 101*x* Connector
106, 106*x* Electrode
107 First end
108 Second end
111 Case
116 Partition
121 Second protrusion
122 Rotating part
123 Lower surface
126 First protrusion
131 Insertion opening
136 Slider
136*x* First moving member
137, 148*a*, 148*b* Side surface
139 Protrusion
141, 141*a*, 141*b*, 141*c*, 141*d*, 141*n* Member

141*x* Second moving member
142, 142*a* Dent
143, 143*a*, 143*b*, 143*c*, 143*d* Inclined member part
144, 144*a*, 144*b*, 144*c*, 144*d*, 149, 149*a*, 149*b*, 149*c*, 149*d* Horizontal member part
145 Upper surface
147 Hole
200 Device
201 Top plate
204 Connector
205 Opening
211 Housing
301 Substrate
302 Substrate part
303*a*, 303*b* Recess
306 Terminal part
307 Terminal
901*a* Left part
901*b* Rear part
901*c* Right part
901*d* Front part
901*e* Bottom part
911 Space

What is claimed is:

1. A connector provided with an opening for performing insertion of a terminal provided in a substrate terminal part in an insertion direction perpendicular to a longitudinal direction of the terminal, the connector comprising:

a first member that performs a first movement in the insertion direction;

a second member that performs, by the first movement, a second movement in a direction substantially perpendicular to the insertion direction; and an electrode that has a part secured to the second member, and following the second movement, performs contact with a predetermined terminal of the substrate terminal part and releases the contact, wherein the electrode includes a first end and a second end, a vicinity of the first end is secured to a moving surface on which the second member slides during the second movement, and a vicinity of the second end is connected to the second member.

2. The connector according to claim 1, further comprising a guide member that sets a direction of the second movement.

3. The connector according to claim 2, wherein the guide member is secured to a surface subjected to the second movement.

4. The connector according to claim 1, wherein a surface subjected to the first movement is continuous with a surface subjected to the second movement.

5. The connector according to claim 1, wherein a surface subjected to the first movement and a surface subjected to the second movement are on a same plane.

6. The connector according to claim 1, wherein the second member includes a first horizontal part, an inclined part connected to the first horizontal part, and a second horizontal part connected to the inclined part, the first horizontal part and the second horizontal part are substantially parallel to a direction of the first movement, and the first horizontal part is more apart from a central axis in a longitudinal direction of the first member than the second horizontal part.

7. The connector according to claim 1, wherein a plurality of pairs of the electrode and the second member are provided.

8. The connector according to claim 7, wherein a plurality of the second members are provided, and some of the second members and other of the second members are different in shape from each other.

9. The connector according to claim 1, wherein the first movement is performed by sliding of the first member on a first surface.

10. The connector according to claim 1, wherein the second movement is performed by sliding of the second member on a second surface.

11. The connector according to claim 1, wherein the electrode and a predetermined terminal of the substrate terminal part come into contact with each other when the second member is located at a predetermined point.

12. The connector according to claim 11, wherein, following the second movement, a contact part subjected to the contact of the electrode performs a third movement in a direction of the second movement.

13. The connector according to claim 11, further comprising a first protrusion that fits into a first recess provided on the substrate terminal part when the substrate terminal part is properly attached.

14. The connector according to claim 11, further comprising a second protrusion that is secured to a rotating part that rotates around a rotating shaft installed in a vicinity of an insertion opening of the substrate terminal part, and, when the substrate terminal part is properly attached, fits into a second recess provided on the substrate terminal part.

15. The connector according to claim 1, further comprising a first opening open to a first direction and a second opening open to a second direction different from the first direction.

16. The connector according to claim 1, wherein the electrode is composed of a linear conductor having elasticity.

17. The connector according to claim 1, wherein the second movement is caused by a motion that a second inclined surface formed on the second member slides on a first inclined surface formed on the first member.

18. A connector provided with an opening for performing insertion of a terminal provided in a substrate terminal part in an insertion direction perpendicular to a longitudinal direction of the terminal, the connector comprising:

a first member that performs a first movement in the insertion direction;

a second member that performs, by the first movement, a second movement in a direction substantially perpendicular to the insertion direction; and an electrode that has a part secured to the second member, and following the second movement, performs contact with a predetermined terminal of the substrate terminal part and releases the contact, wherein the second member is provided with a dent into which a part of the electrode fits by the second movement.

19. The connector according to claim 18, further comprising a first opening open to a first direction and a second opening open to a second direction different from the first direction.

20. A connector provided with an opening for performing insertion of a terminal provided in a substrate terminal part in an insertion direction perpendicular to a longitudinal direction of the terminal, the connector comprising:

a first member that performs a first movement in the insertion direction;

a second member that performs, by the first movement, a second movement in a direction substantially perpendicular to the insertion direction; and an electrode that has a part secured to the second member, and following the second movement, performs contact with a predetermined terminal of the substrate terminal part and releases the contact, wherein wherein a plurality of pairs of the electrode and the second member are provided, a plurality of the second members are provided, and some of the second members and other of the second members are different in shape from each other, each second member includes a first horizontal part being an end of the second member, an inclined part being the end connected to the first horizontal part, and a second horizontal part being the end connected to the inclined part, the first horizontal part and the second horizontal part are substantially parallel to a direction of the first movement, the first horizontal part is more apart from a central axis in a longitudinal direction of the first member than the second horizontal part, and the some of the second members and the other of the second members are different from each other in length of the first horizontal part.

* * * * *